(12) United States Patent
Nathan et al.

(10) Patent No.: US 9,910,526 B2
(45) Date of Patent: Mar. 6, 2018

(54) PRESSURE SENSING DISPLAY DEVICE

(71) Applicant: Cambridge Touch Technologies, Ltd., Montreal (CA)

(72) Inventors: Arokia Nathan, Cambridge (GB); Jackson Chi Sun Lai, Mississauga (CA); Suk-Bae Cha, Tokyo (JP); Corbin Church, Westmount (CA)

(73) Assignee: Cambridge Touch Technologies, Ltd., Cambridge (GB)

( * ) Notice: Subject to any disclaimer, the term of this patent is extended or adjusted under 35 U.S.C. 154(b) by 49 days.

(21) Appl. No.: 13/857,742

(22) Filed: Apr. 5, 2013

(65) Prior Publication Data
US 2013/0265256 A1   Oct. 10, 2013

Related U.S. Application Data

(60) Provisional application No. 61/621,491, filed on Apr. 7, 2012.

(51) Int. Cl.
*G06F 3/041* (2006.01)
(52) U.S. Cl.
CPC .......... *G06F 3/0414* (2013.01); *G06F 3/0412* (2013.01); *G06F 2203/04106* (2013.01)
(58) Field of Classification Search
CPC ............... G06F 3/0412; G06F 3/0414; G06F 2203/04106; G01L 1/20–1/22; G01L 1/215; G01L 1/146; H01L 27/323
See application file for complete search history.

(56) References Cited

U.S. PATENT DOCUMENTS

| | | | |
|---|---|---|---|
| 4,516,112 A | 5/1985 | Chen | |
| 4,899,710 A | 2/1990 | Takahashi et al. | |
| 4,962,328 A * | 10/1990 | Woss | H03F 3/70 327/540 |
| 5,563,587 A * | 10/1996 | Harjani | H03F 3/45928 330/9 |
| 5,942,733 A | 8/1999 | Allen | |
| 7,042,288 B2 | 5/2006 | Matsui et al. | |
| 7,538,760 B2 | 5/2009 | Hotelling | |
| 8,482,530 B2 | 7/2013 | Bollinger | |

(Continued)

FOREIGN PATENT DOCUMENTS

| EP | 0574213 A1 | 12/1993 |
|---|---|---|
| EP | 2693316 A1 | 2/2014 |

(Continued)

OTHER PUBLICATIONS

Office action in related U.S. Appl. No. 13/935,392.

(Continued)

*Primary Examiner* — Xuemei Zheng

(57) ABSTRACT

A pressure sensing architecture for use with liquid crystal (LC), organic light emitting diode (OLED), electrophoretic, or other similarly fabricated displays. The described architecture includes a bottom TFT structure and a top structure with color filter material, and with liquid crystal, electrophoretic or OLED material provided in between. A piezoelectric or equivalent material is provided within the display assembly. Transmitting and receiving electrodes can be used to electrically bias the piezoelectric or equivalent material, which provides an analog electrical signal in response to incident touch pressure.

19 Claims, 23 Drawing Sheets

(56) References Cited

U.S. PATENT DOCUMENTS

| | | | |
|---|---|---|---|
| 8,854,064 B2 | 10/2014 | Aras | |
| 8,982,081 B2 | 3/2015 | Li et al. | |
| 8,988,384 B2 | 3/2015 | Krah et al. | |
| 9,348,473 B2 | 5/2016 | Ando | |
| 9,360,967 B2 | 6/2016 | Hotelling | |
| 9,383,884 B2 | 7/2016 | Ando | |
| 9,575,608 B2 | 2/2017 | Ando | |
| 9,627,605 B2 | 4/2017 | Ando | |
| 2002/0033920 A1 | 3/2002 | Sun et al. | |
| 2004/0155991 A1* | 8/2004 | Lowles et al. | 349/12 |
| 2005/0024344 A1* | 2/2005 | Trachte | 345/173 |
| 2006/0017710 A1 | 1/2006 | Lee et al. | |
| 2006/0138983 A1* | 6/2006 | Lee | G06F 3/0414 349/56 |
| 2007/0024596 A1 | 2/2007 | Takahashi et al. | |
| 2007/0040814 A1 | 2/2007 | Lee et al. | |
| 2007/0119698 A1 | 5/2007 | Day | |
| 2007/0163815 A1 | 7/2007 | Ungaretti et al. | |
| 2007/0236466 A1 | 10/2007 | Hotelling | |
| 2007/0262964 A1 | 11/2007 | Zotov | |
| 2008/0007532 A1 | 1/2008 | Chen | |
| 2008/0018608 A1 | 1/2008 | Serban et al. | |
| 2008/0048995 A1* | 2/2008 | Abileah | G06F 3/03542 345/173 |
| 2008/0165158 A1 | 7/2008 | Hotelling et al. | |
| 2008/0176042 A1 | 7/2008 | Sugawara et al. | |
| 2008/0277171 A1 | 11/2008 | Wright | |
| 2009/0027353 A1* | 1/2009 | Im et al. | 345/173 |
| 2009/0061823 A1 | 3/2009 | Se | |
| 2009/0065267 A1 | 3/2009 | Sato | |
| 2009/0066663 A1 | 3/2009 | Chang | |
| 2009/0066673 A1 | 3/2009 | Molne | |
| 2009/0146533 A1 | 6/2009 | Leskinen | |
| 2009/0160822 A1 | 6/2009 | Eguchi | |
| 2009/0237374 A1 | 9/2009 | Li | |
| 2009/0254869 A1 | 10/2009 | Ludwig et al. | |
| 2009/0309616 A1 | 12/2009 | Klinghult et al. | |
| 2009/0321240 A1 | 12/2009 | Huang et al. | |
| 2010/0013800 A1 | 1/2010 | Elias et al. | |
| 2010/0051354 A1 | 3/2010 | Kusuma | |
| 2010/0066692 A1 | 3/2010 | Noguchi | |
| 2010/0079384 A1 | 4/2010 | Grivna | |
| 2010/0109595 A1 | 5/2010 | Tan et al. | |
| 2010/0110026 A1 | 5/2010 | Kis | |
| 2010/0110028 A1 | 5/2010 | Takahashi et al. | |
| 2010/0128002 A1 | 5/2010 | Stacy et al. | |
| 2010/0134439 A1 | 6/2010 | Ito et al. | |
| 2010/0144391 A1 | 6/2010 | Chang | |
| 2010/0149128 A1 | 6/2010 | No et al. | |
| 2010/0201635 A1 | 8/2010 | Klinghult et al. | |
| 2010/0231530 A1 | 9/2010 | Lin et al. | |
| 2010/0253638 A1 | 10/2010 | Yousefpor | |
| 2010/0253645 A1 | 10/2010 | Bolender et al. | |
| 2010/0265197 A1 | 10/2010 | Purdy et al. | |
| 2010/0265212 A1 | 10/2010 | Sekiguchi et al. | |
| 2010/0309164 A1 | 12/2010 | Yeh et al. | |
| 2011/0001492 A1 | 1/2011 | Nys | |
| 2011/0007020 A1 | 1/2011 | Hong et al. | |
| 2011/0037624 A1 | 2/2011 | Pance | |
| 2011/0096025 A1 | 4/2011 | Slobodin | |
| 2011/0157087 A1 | 6/2011 | Kanehira et al. | |
| 2011/0175844 A1* | 7/2011 | Berggren | 345/174 |
| 2011/0227836 A1 | 9/2011 | Li | |
| 2011/0234508 A1 | 9/2011 | Oda et al. | |
| 2011/0260990 A1 | 10/2011 | Ali et al. | |
| 2011/0261007 A1 | 10/2011 | Joh | |
| 2011/0267300 A1 | 11/2011 | Serban et al. | |
| 2011/0273396 A1 | 11/2011 | Chung | |
| 2011/0278078 A1 | 11/2011 | Schediwy et al. | |
| 2011/0291994 A1 | 12/2011 | Kwak | |
| 2012/0013572 A1 | 1/2012 | Pak et al. | |
| 2012/0038583 A1 | 2/2012 | Westhues et al. | |
| 2012/0057803 A1 | 3/2012 | Wakazono | |
| 2012/0062508 A1* | 3/2012 | Liu et al. | 345/174 |
| 2012/0075226 A1 | 3/2012 | Andoh | |
| 2012/0081332 A1 | 4/2012 | Atsuta et al. | |
| 2012/0105367 A1 | 5/2012 | Son | |
| 2012/0121142 A1 | 5/2012 | Nagesh | |
| 2012/0154326 A1 | 6/2012 | Liu | |
| 2012/0188202 A1 | 7/2012 | Tsujino et al. | |
| 2012/0242610 A1* | 9/2012 | Yasumatsu | 345/173 |
| 2012/0242619 A1 | 9/2012 | Barbosa et al. | |
| 2012/0268416 A1 | 10/2012 | Pirogov | |
| 2012/0274599 A1 | 11/2012 | Schediwy | |
| 2012/0293551 A1 | 11/2012 | Momeyer | |
| 2012/0299866 A1 | 11/2012 | Pao et al. | |
| 2012/0299868 A1 | 11/2012 | Bhagavat | |
| 2013/0009653 A1 | 1/2013 | Fukushima | |
| 2013/0009905 A1 | 1/2013 | Castillo | |
| 2013/0018489 A1 | 1/2013 | Grunthaner et al. | |
| 2013/0021285 A1 | 1/2013 | Kimura | |
| 2013/0050126 A1* | 2/2013 | Kimura et al. | 345/173 |
| 2013/0050130 A1* | 2/2013 | Brown | 345/174 |
| 2013/0050138 A1 | 2/2013 | Chan et al. | |
| 2013/0076646 A1 | 3/2013 | Krah | |
| 2013/0076647 A1 | 3/2013 | Yousefpor | |
| 2013/0082970 A1 | 4/2013 | Frey et al. | |
| 2013/0113752 A1 | 5/2013 | Chang et al. | |
| 2013/0135244 A1 | 5/2013 | Lynch | |
| 2013/0162587 A1 | 6/2013 | Chan et al. | |
| 2013/0167663 A1 | 7/2013 | Eventoff | |
| 2013/0176265 A1 | 7/2013 | Zurek | |
| 2013/0176275 A1 | 7/2013 | Weaver | |
| 2013/0194198 A1 | 8/2013 | Guard | |
| 2013/0229382 A1 | 9/2013 | Huang | |
| 2013/0234986 A1 | 9/2013 | Elias | |
| 2013/0234987 A1 | 9/2013 | Ye | |
| 2013/0257744 A1* | 10/2013 | Daghigh et al. | 345/173 |
| 2013/0257759 A1* | 10/2013 | Daghigh | 345/173 |
| 2013/0257769 A1 | 10/2013 | Sheik-Nainar | |
| 2013/0257783 A1 | 10/2013 | Luo | |
| 2013/0257799 A1 | 10/2013 | Lamont et al. | |
| 2013/0265239 A1 | 10/2013 | Parekh et al. | |
| 2013/0265276 A1 | 10/2013 | Obeidat | |
| 2013/0278542 A1 | 10/2013 | Stephanou et al. | |
| 2013/0285970 A1 | 10/2013 | Ahn et al. | |
| 2013/0300695 A1 | 11/2013 | Cho et al. | |
| 2013/0307823 A1 | 11/2013 | Grivna | |
| 2014/0002114 A1 | 1/2014 | Schwartz et al. | |
| 2014/0008203 A1 | 1/2014 | Nathan | |
| 2014/0009433 A1 | 1/2014 | Chen et al. | |
| 2014/0009434 A1 | 1/2014 | Hiroyuki | |
| 2014/0013865 A1 | 1/2014 | White et al. | |
| 2014/0028606 A1 | 1/2014 | Gianetta | |
| 2014/0028611 A1 | 1/2014 | Chen | |
| 2014/0043287 A1 | 2/2014 | Nakajima | |
| 2014/0043289 A1 | 2/2014 | Stern | |
| 2014/0049892 A1 | 2/2014 | Huang et al. | |
| 2014/0055407 A1 | 2/2014 | Lee et al. | |
| 2014/0062933 A1 | 3/2014 | Coulson et al. | |
| 2014/0062934 A1 | 3/2014 | Coulson et al. | |
| 2014/0071077 A1 | 3/2014 | Kang | |
| 2014/0078101 A1 | 3/2014 | Katsurahira | |
| 2014/0085213 A1 | 3/2014 | Huppi et al. | |
| 2014/0085247 A1 | 3/2014 | Leung et al. | |
| 2014/0139444 A1 | 5/2014 | Kauhanen | |
| 2014/0176493 A1 | 6/2014 | Ahn et al. | |
| 2014/0210781 A1 | 7/2014 | Stern | |
| 2014/0216174 A1 | 8/2014 | Aberg et al. | |
| 2014/0240621 A1 | 8/2014 | Klinghult | |
| 2014/0247231 A1 | 9/2014 | Lin et al. | |
| 2014/0267128 A1 | 9/2014 | Bulea et al. | |
| 2014/0267134 A1 | 9/2014 | Bulea et al. | |
| 2014/0285456 A1 | 9/2014 | Zhang | |
| 2014/0292699 A1 | 10/2014 | Ando | |
| 2014/0307186 A1 | 10/2014 | Yun et al. | |
| 2014/0360854 A1 | 12/2014 | Roziere et al. | |
| 2014/0368260 A1 | 12/2014 | Tanada | |
| 2015/0002452 A1 | 1/2015 | Klinghult | |
| 2015/0193056 A1 | 7/2015 | Bolander | |
| 2015/0253935 A1 | 9/2015 | Toda | |
| 2015/0338981 A1 | 11/2015 | Ando et al. | |
| 2015/0355771 A1 | 12/2015 | Watazu | |
| 2016/0034088 A1 | 2/2016 | Richards et al. | |

(56) References Cited

U.S. PATENT DOCUMENTS

| | | | |
|---|---|---|---|
| 2016/0041648 A1 | 2/2016 | Richards | |
| 2016/0062497 A1 | 3/2016 | Huppi et al. | |
| 2016/0062498 A1 | 3/2016 | Huppi et al. | |

FOREIGN PATENT DOCUMENTS

| | | |
|---|---|---|
| EP | 2871554 A1 | 5/2015 |
| EP | 2884373 A1 | 6/2015 |
| EP | 2899615 A1 | 7/2015 |
| JP | 2013131110 A | 7/2013 |
| JP | 2014209297 A | 11/2014 |
| WO | 2007146785 A1 | 12/2007 |
| WO | 2009150498 A1 | 12/2009 |
| WO | 2011055809 A1 | 5/2011 |
| WO | 2011156447 A1 | 12/2011 |
| WO | 2012031564 A1 | 3/2012 |
| WO | 2012034714 A1 | 3/2012 |
| WO | 2013043336 A1 | 3/2013 |
| WO | 2014092758 A1 | 6/2014 |
| WO | 2014094283 A1 | 6/2014 |
| WO | 2014098946 A1 | 6/2014 |
| WO | 2014129083 A1 | 8/2014 |
| WO | 2014192786 A1 | 12/2014 |
| WO | 2015046289 A1 | 4/2015 |
| WO | 2015098725 A1 | 7/2015 |

OTHER PUBLICATIONS

PCT international search report in related PCT application PCT/CA2013/000613 or publication WO2014005218.
Written opinion of the international searching authority in related PCT application PCT/CA2013/000613 or publication WO2014005218.
PCT international search report in counterpart PCT application PCT/CA2013/000326 or publication WO2013149331.
Written opinion of the international searching authority in counterpart PCT application PCT/CA2013/000326 or publication WO2013149331.
Candes et al, An Introduction to Compressive Sampling, IEEE Signal Processing magazine, Mar. 2008, pp. 21-30.
Final office action in Related U.S. Appl. No. 13/935,392, dated Nov. 3, 2015.
Non-final office action in Related U.S. Appl. No. 13/935,392, dated Mar. 16, 2016.
Office action in related U.S. Appl. No. 13/935,392 dated Aug. 2, 2016, Nov. 11, 2016.
EPO search report in related EPO application EP 20130813515, dated Jun. 6, 2016.
Search Report from the UK Patent Office, dated Dec. 21, 2015, for UK Application No. GB 1512621.2.
Search Report from the UK Patent Office, dated May 12, 2016, for UK Application No. GB 1519948.2, Nov. 11, 2016.
Non-final office action in Related U.S. Appl. No. 13/935,392, dated Feb. 27, 2017.
Advisory action in related U.S. Appl. No. 13/935,392, dated Jan. 10, 2017.
Written Opinion of the International Searching Authority in PCT application PCT/GB2015/054157, dated Jul. 19, 2016.
International Search Report in PCT application PCT/GB2015/054157, dated Jul. 19, 2016.
Machine language translation of Japanese application 2013131110, sent with PCT search report.
Written Opinion of the International Searching Authority in PCT application PCT/GB2016053489, dated May 2017.
International Search Report in PCT application PCT/GB2016053489, dated Feb. 20, 2017.
Shen,"Sensor-on-cover projected capacitive touch shipping, says Display Search" DIGITIMES, Dec. 23, 2011.
Bonnington, "Force-Sensing Tech Adds Third Dimension to Touchscreens" retrieved from web at wired.com/gadgetlab/2011/04/force-sensitive-touchscreen, Apr. 6, 2011.
Ricknas, "Synaptics working on more advanced touch for smartphones", TechWorld, Sep. 12, 2011.
Levin et al. "Tactile-Feedback Solutions for an Enhanced User Experience" Information Display, Oct. 2009.
David, "Touch Screen Technology 101. A Primer on Popular Touch Screen Types" Americas Display Engineering & Applications Conference, 2006.
Park, "Apple files patent application for pressure-sensitive touch-screen technology" Info Mobile Reviews Blog, published Oct. 8, 2007.
Final office action in Related U.S. Appl. 13/935,392, dated Jul. 18, 2017.
Search and Examination Report From the UK Patent Office, dated Dec. 21, 2015, for UK Priority Application No. GB 1512621.2, (Resubmitted to include search report table on p. 4 of document which was missing from document when previously submitted).
Chenchi Luo et al: "Compressive Sensing for Sparse Touch Detection on Capacitive Touch Screens", IEEE Journal on Emerging and Selected Topics in Circuits and Systems, IEEE, Piscataway, NJ, USA, vol. 2, No. 3, Sep. 1, 2012 (Sep. 1, 2012), pp. 639-648.
Non-final office action in related U.S. Appl. No. 13/935,392, dated Jan. 5, 2018.

* cited by examiner

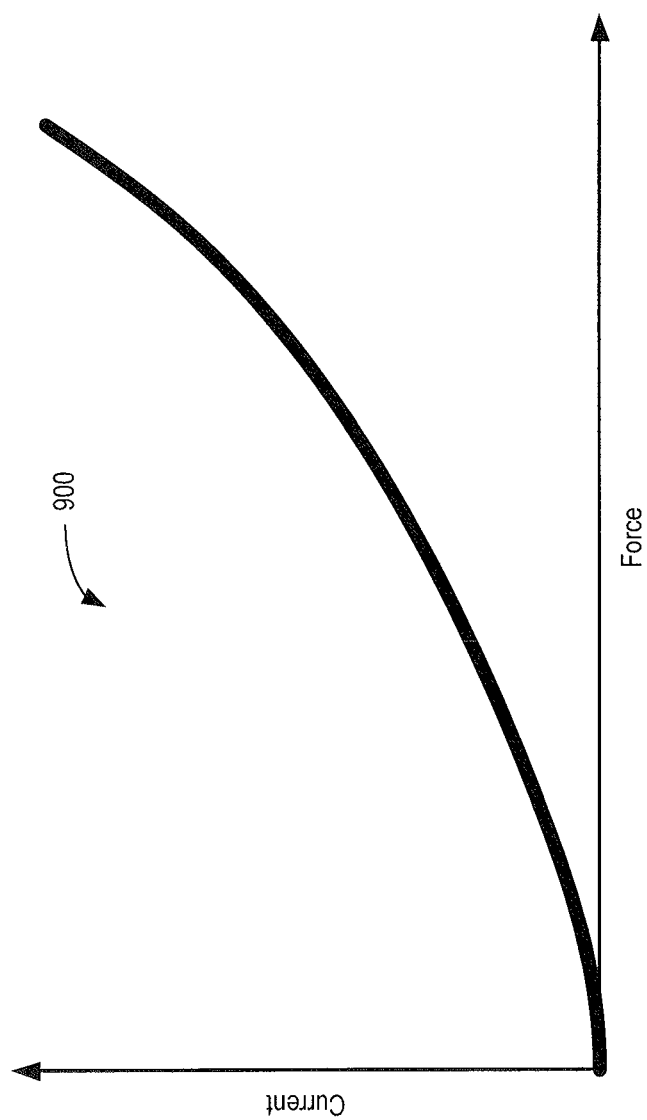

PRESSURE SENSING DISPLAY DEVICE

CROSS-REFERENCE TO RELATED APPLICATION

This application claims the benefit of U.S. Provisional Patent Application No. 61/621,491, filed Apr. 7, 2012, the entire contents of which are hereby incorporated by reference.

FIELD

The described embodiments relate to touch sensing digital displays and, in particular, to force or pressure sensing in touch sensing displays.

BACKGROUND

Touch panel displays are widely used in consumer electronics, such as smartphones and computing tablets, among other devices. Broadly speaking, there are two types of touch panel technologies currently used in consumer electronics: projected capacitance and resistive. Both types of touch panels typically can only sense the location and time of a touch event on the touch panel (e.g., from a finger or stylus). The location of a touch event is typically recorded only in two dimensions (e.g., x-y coordinates). Conventional touch panels are unable to sense in a third dimension to determine the magnitude of a touch force (e.g., a z-coordinate). Prior attempts at three-dimensional sensing have typically focused on the inclusion of a sensitive analog element. Conventionally, the inclusion of an analog element in what is otherwise a digital system has been costly, bulky and non-trivial.

In contrast, in concert with trends in the smartphone industry, and the computing industry more generally, touch panel displays continue to become thinner and less costly. One approach to reduce costs while making displays thinner is to integrate touch panel elements with display elements in a so-called "in-cell" fashion, as opposed to "on-cell" approaches.

On-cell approaches typically provide a touch panel display by stacking transparent touch location sensing elements (e.g., traces for capacitive touch sensing) on top of display elements. In-cell approaches typically provide a touch panel display by interspersing touch location sensing elements between layers of the display elements. For example, in one approach, touch location sensing traces may be provided between the liquid crystal layer and a color filter layer in an LCD device.

SUMMARY

In a first broad aspect, there is provided a pressure sensing display device, comprising: a cover layer; a base layer; a plurality of display pixels provided above the base layer and below the cover layer; a plurality of pressure sensing elements provided above the base layer, wherein each of the pressure sensing elements is addressable to provide an output based on a force applied to the pressure sensing element; and at least one amplifier configured to detect the output of each addressed pressure sensing element and provide an output pressure value.

An integrated circuit layer may be provided above the base layer, and the integrated circuit layer comprises a thin film transistor circuit.

An output of the pressure sensing element may be coupled to an input of the at least one amplifier.

The at least one amplifier may be a charge amplifier, and charge at an output of the pressure sensing element may be coupled to an input of the at least one amplifier by an addressing transistor.

Each of the pressure sensing elements may further comprise an integrator, and an amplifier output of the integrator may be coupled to an input of the at least one amplifier by an addressing transistor.

An output of a pressure sensing portion of the pressure sensing element may be resettable by a reset transistor.

An output of the at least one amplifier may be coupled to an input of a correlated double sampler.

An insulating layer may be provided between the pressure sensing elements and the base layer.

An insulating layer may be provided between multiple layers of pressure sensing elements and the base layer.

The insulating layer may be formed of a dielectric material. The dielectric material may be aluminum oxide, silicon dioxide or silicon nitride, for example. The dielectric material may be optically transparent.

The pressure sensing elements may be provided in a layer above the display pixels. The pressure sensing elements may be provided in a layer below the display pixels. The pressure sensing elements may be substantially co-planar with the display pixels.

The display pixels may be arranged in a grid, and the pressure sensing elements may replace display pixels in the grid at selected intervals.

The display pixels may be arranged in a first grid, and the pressure sensing elements may be arranged in a second grid. The second grid may correspond to the first grid.

A controller may also be provided. The controller may detect a blanking interval of the display pixels, and each pressure sensing element may be addressed during the blanking interval. The blanking interval may be a horizontal blanking interval or a vertical blanking interval. The blanking interval may be selectively determined by the controller between a horizontal and a vertical blanking interval.

In another broad aspect, there is provided a method of pressure sensing in a display device comprising: providing a plurality of display pixels provided above a base layer and below a cover layer of the display device; providing a plurality of pressure sensing elements above the base layer; addressing each of the pressure sensing elements is addressable to provide an output based on a force applied to the pressure sensing element; and detecting the output of each addressed pressure sensing element at at least one amplifier to provide an output pressure value.

BRIEF DESCRIPTION OF THE DRAWINGS

A preferred embodiment of the present invention will now be described in detail with reference to the drawings, in which:

FIG. 9 is an example current-force characteristic for a pressure sensitive material.

DESCRIPTION OF EXEMPLARY EMBODIMENTS

Existing approaches to pressure sensing in a touch panel display have focused on the use of a separate sensor film layer with multiple cells or with separate pressure sensing traces. In a cell-based approach, an applied force deforms the sensor film layer, causing a change in the distance between cells, and a corresponding change in a voltage or current. Such an approach provides only a linear measurement of the applied pressure, and thus may be limited by the small deformation distance typical in most displays. In a trace-based approach, a non-anisotropic film is used, which limits the ability of the device to determine the x-y location of the touch, particularly in multi-touch systems.

Another known approach measures the force of a touch event by detecting deflections of a screen or housing and measuring the resulting changes in capacitance values due to changes in a gap distance between the screen and a sensing pad. Such an approach is limited by the arrangement of the sensing pads (e.g., beneath the keys of a virtual keyboard), as it is only able to detect force at the pads.

The described embodiments generally provide an integrated display assembly that has both touch location-sensing and pressure-sensing elements and circuits for driving and controlling the display assembly. The location-sensing elements can be conventional resistive or capacitive touch panel elements. The pressure-sensing elements can be analog elements integrated with and distributed among digital display elements (e.g., one pressure sensing element per display pixel, one pressure sensing element for every n pixels). The pressure-sensing elements may be formed from a material that provides a non-linear output response to an applied force, and which can be current biased to provide high gain and tenability. Moreover, the described embodiments provide methods for achieving low noise operation.

Generally, the assembly includes a substrate upon which the display is fabricated and biasing and operating elements for touch-detection and pressure-detection. The biasing and operating elements may be provided on the same layer as the display elements, or may be provided separately on another layer of the assembly.

Integration of the described pressure-sensing elements into digital display elements can be done during display backplane fabrication, thereby reducing or eliminating manufacturing steps, and the handling of multiple substrates, to minimize fabrication cost.

The described embodiments also provide for low power operation to improve device battery life.

Figure 1:
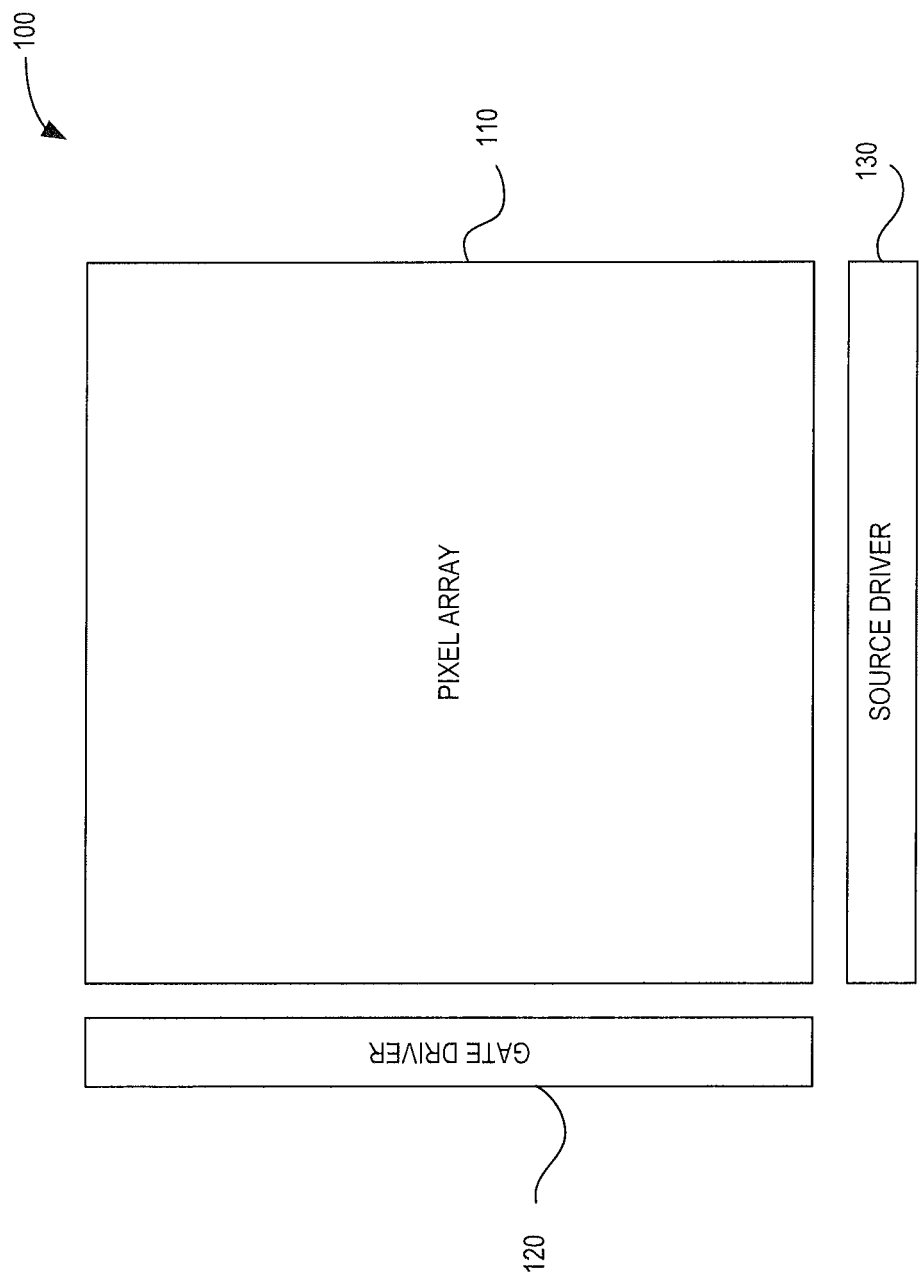
FIG. 1 is a simplified plan view of a display assembly.

Referring now to FIG. 1, there is illustrated a simplified plan view of a display assembly. Display assembly 100 includes a pixel array 110, a gate driver 120 and a source driver 130.

Pixel array 110 may include a backplane with an active matrix comprising individually addressable pixels (e.g., LCD or LED elements), and a frontplane for optical modulation (e.g., color filters, polarizers, etc.). The backplane may include a plurality of layers, formed of various materials such as glass, polyester and paper.

Each addressable pixel may comprise one or more transistors and, in particular, a thin-film transistor (TFT), for controlling the operation of the pixel. In some embodiments, each pixel may consist of separate sub-pixels, each individually controllable, that are provided with different color filters.

Gate driver 120 and source driver 130 are generally integrated circuits that drive the operation of pixel array 110. Both gate driver 120 and source driver 130 may be integrated into pixel array 110, or provided as separate circuits in a display module using, for example, a flexible printed circuit, chip on glass or chip on flex approach.

In operation, display assembly 100 forms an image by scanning lines of pixels in pixel array 110. Gate driver 120 provides a signal to open or activate selected pixels (or sub-pixels) in each line of pixel array 110. Source driver 130 then charges each pixel in the line to a preconfigured voltage.

Figure 2A:
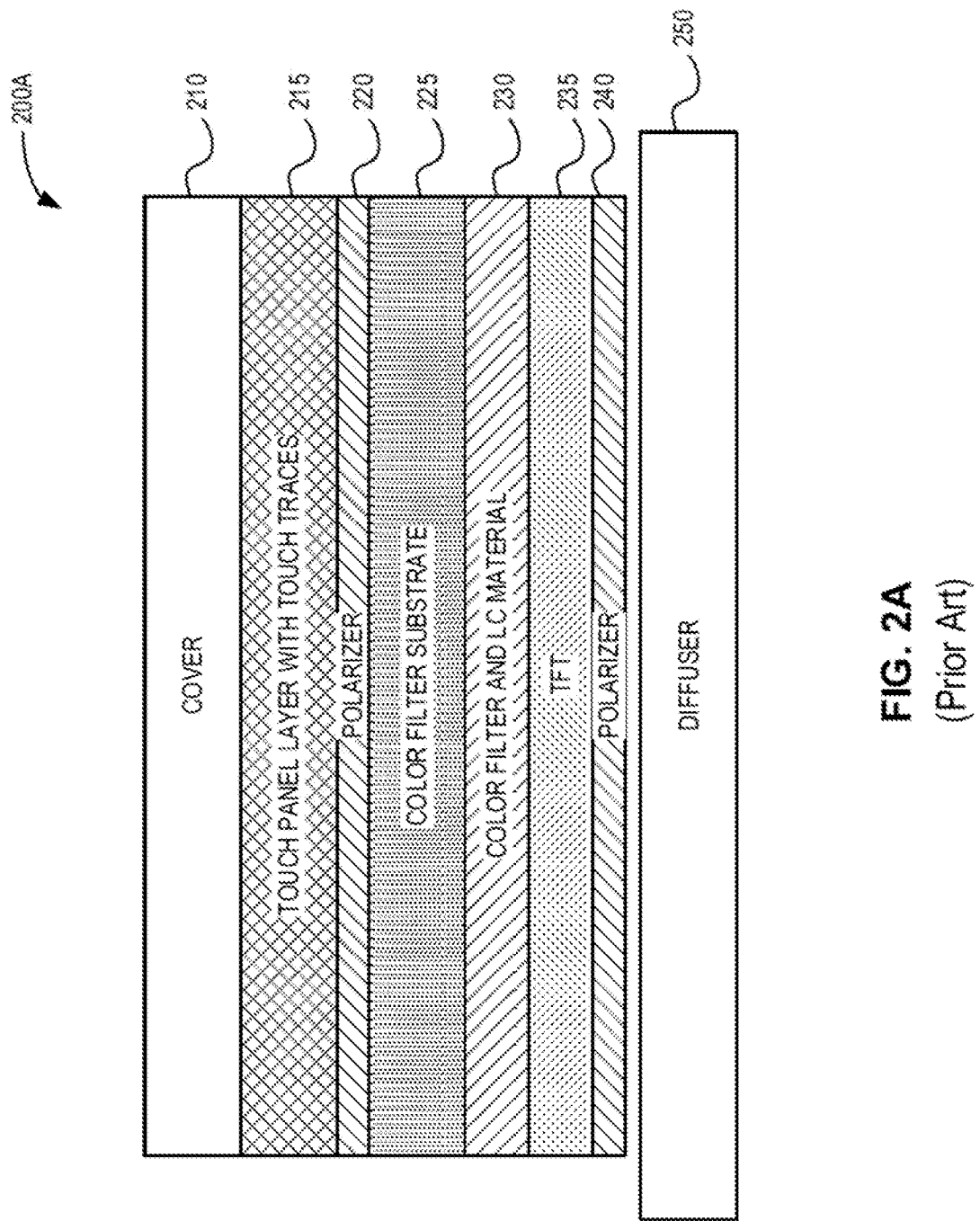
FIGS. 2A to 2G are simplified cross-sectional views of portions of various prior art display assemblies.

Referring now to FIG. 2A, there is illustrated a simplified cross-sectional view of a portion of a prior art display assembly. Display assembly 200A generally includes an LCD device with a separate touch panel.

In particular, display assembly 200A has a diffuser 250 that serves as a bottom layer or substrate. Diffuser 250 may be a light guide plate (LGP), a brightness enhancing film (BEF) or other suitable diffusing element that serves to diffuse light from, for example, an LED backlight that produces broad spectrum (e.g., white) light.

A polarizer 240 is stacked atop diffuser 250 to polarize light from diffuser 250 and direct it through a TFT layer 235. TFT layer 235 includes integrated circuits for controlling each pixel or sub-pixel element in the display assembly 200A. In some cases, TFT layer 235 may also serve as a base layer, providing a substrate upon which further layers may be stacked.

A color filter and liquid crystal layer 230 is stacked atop TFT layer 230. Layer 230 includes liquid crystal elements that respond to control outputs from TFT layer 230 to become selectively opaque or partially opaque. Color filter elements are used to admit only selected wavelengths to cause the pixels or sub-pixels to appear to provide only light of the desired color (e.g., red, green, blue).

A color filter substrate layer 225 is stacked atop layer 230. Color filter substrate layer 225 may be a glass substrate, for example, upon which the color filter portion of layer 230 is adhered or affixed. Generally, the liquid crystal portion of layer 230 is below the color filter portion. A further polarizer 220 is provided to ensure that stray light does not escape.

Layers 250, 240, 235, 230, 225 and 220 generally comprise a conventional LCD display assembly. In a conventional approach, a touch panel layer 215 may be stacked atop the conventional LCD display assembly, and a cover layer (e.g., lens) may be affixed to the assembly.

Each of the layers of display assembly 200A may be fixed to the other, for example by lamination using a resin or other optically clear adhesive (OCA), portions of the assembly may also be sealed together during fabrication.

Figure 3:
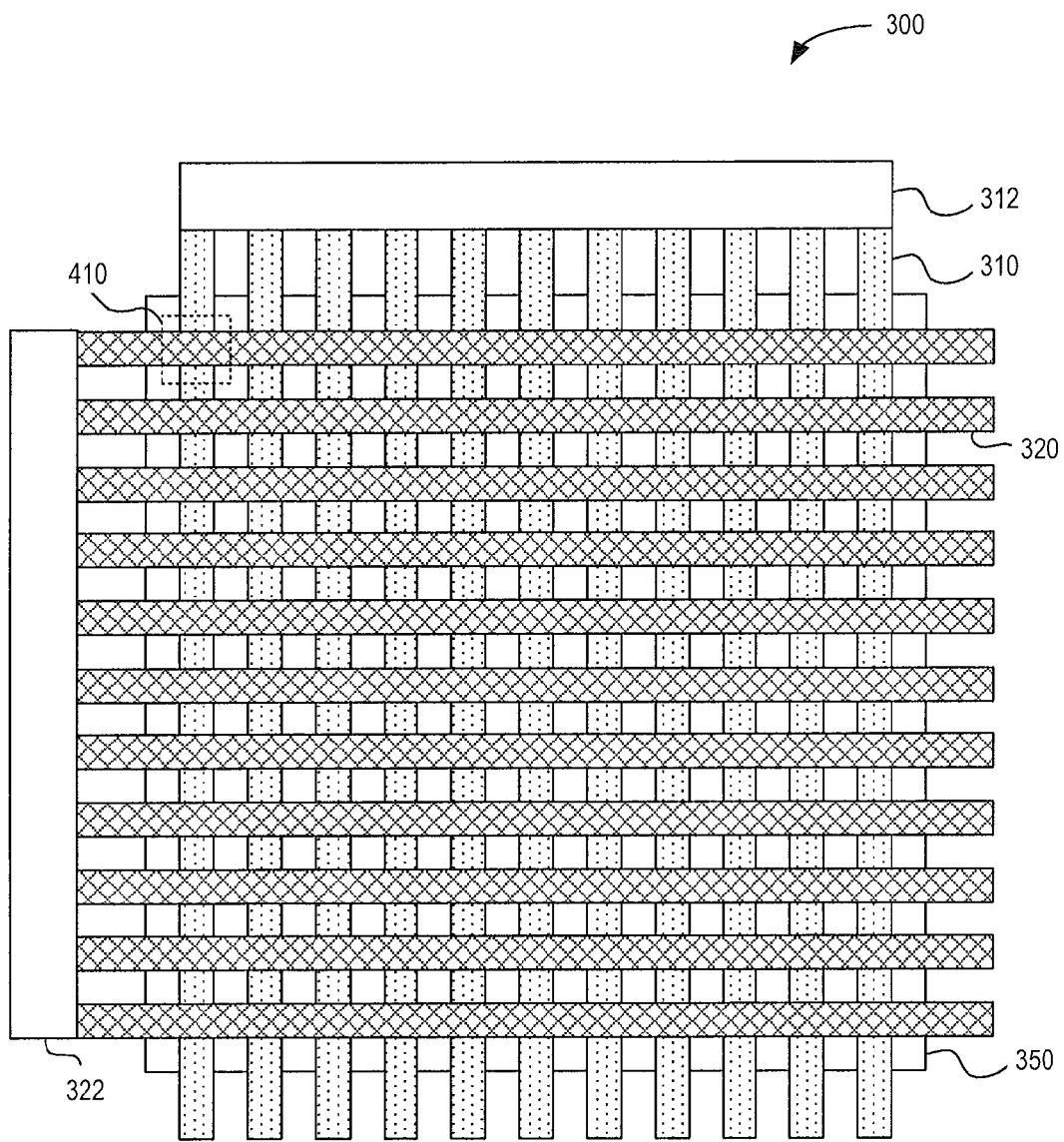
FIG. 3 is a plan view of an example display assembly.

Touch panel layer 215 generally consists of an array of transparent conducting traces, as described herein with reference to FIG. 3.

Figure 2B:
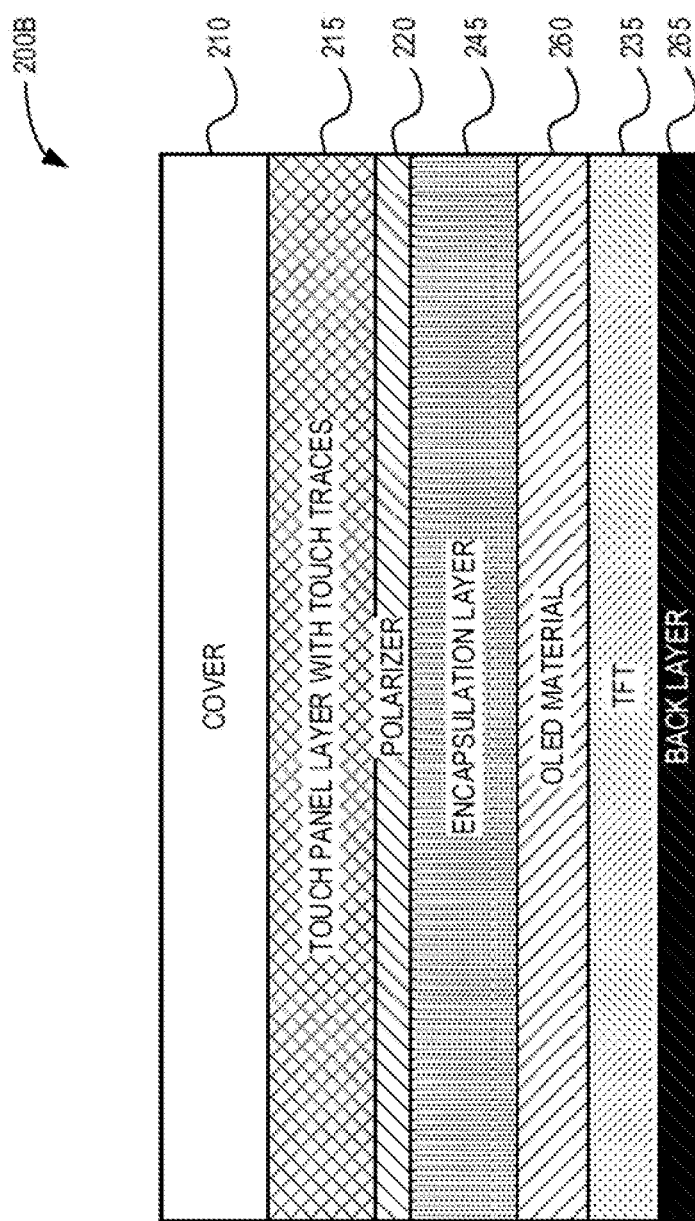

Referring now to FIG. 2B, there is illustrated a simplified cross-sectional view of a portion of another prior art display assembly. Display assembly 200B generally includes an OLED device with a separate touch panel.

Display assembly 200B is fabricated using a similar approach to display assembly 200A, but differs in that a back layer 265 may be used in place of diffuser 250 of assembly 200A.

Back layer 265 is generally a black tape or moisture barrier layer that is optically absorbent. TFT layer 235 is stacked atop back layer 265.

In contrast to display assembly 200A, an OLED material layer 260 is provided atop TFT layer 235. OLED elements respond to control outputs from TFT layer 230 to produce light at varying intensities, or colors, or both.

An encapsulation layer 245 is provided to seal the OLED elements, and a polarizer 220 is also provided. As with assembly 200A, a touch panel layer 215 and a cover 210 are provided to complete display assembly 200B.

It will be appreciated that various modifications can be made to the basic stacks of display assembly 200A or 200B.

Figure 2C:
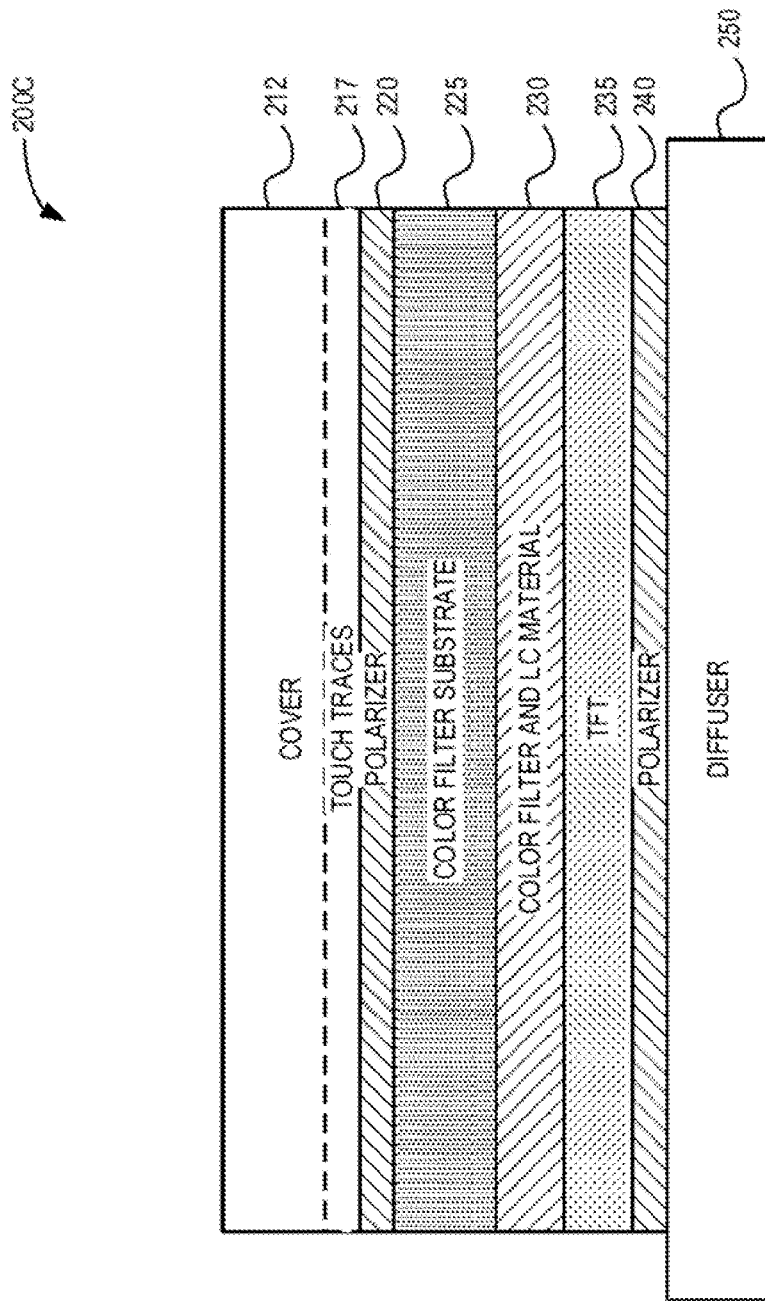

Referring now to FIG. 2C, there is illustrated a simplified cross-sectional view of a portion of another prior art display assembly. Display assembly 200C is generally analogous to display assembly 200A, but differs in that touch sensing elements 217 may be provided on an underside of cover layer 212. For example, transparent conductive traces (e.g., indium tin oxide (ITO), indium zinc oxide (IZO), etc.) may be coated or deposited on the cover layer 212. Accordingly, a separate touch panel layer 215 may be omitted to provide a thinner assembly.

Figure 2D:
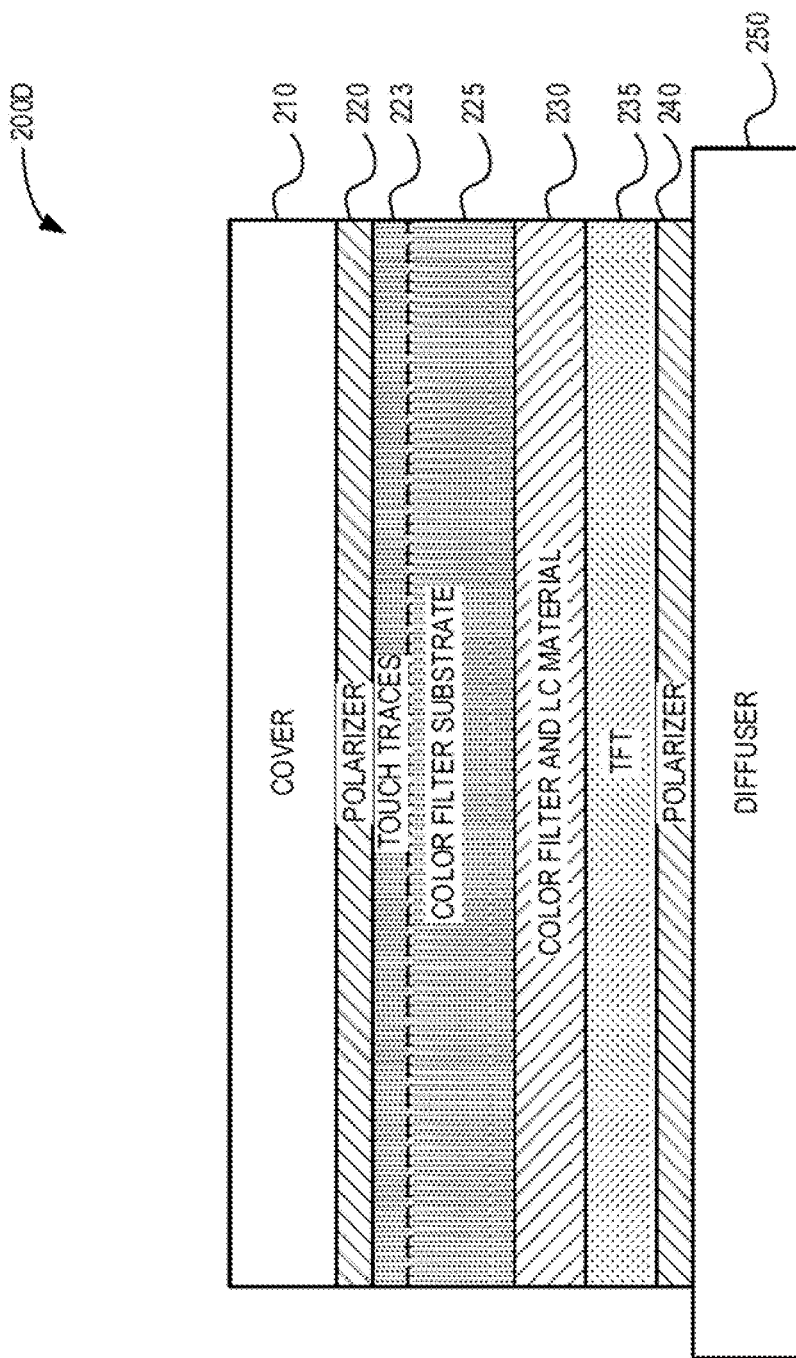

Referring now to FIG. 2D, there is illustrated a simplified cross-sectional view of a portion of another prior art display assembly. Display assembly 200D is generally analogous to display assembly 200A, but differs in that touch sensing elements 223 may be deposited or coated atop color filter substrate layer 225. For example, transparent conductive traces (e.g., indium tin oxide (ITO), indium zinc oxide (IZO), etc.) may be coated or deposited on the color filter layer 225.

Figure 2E:
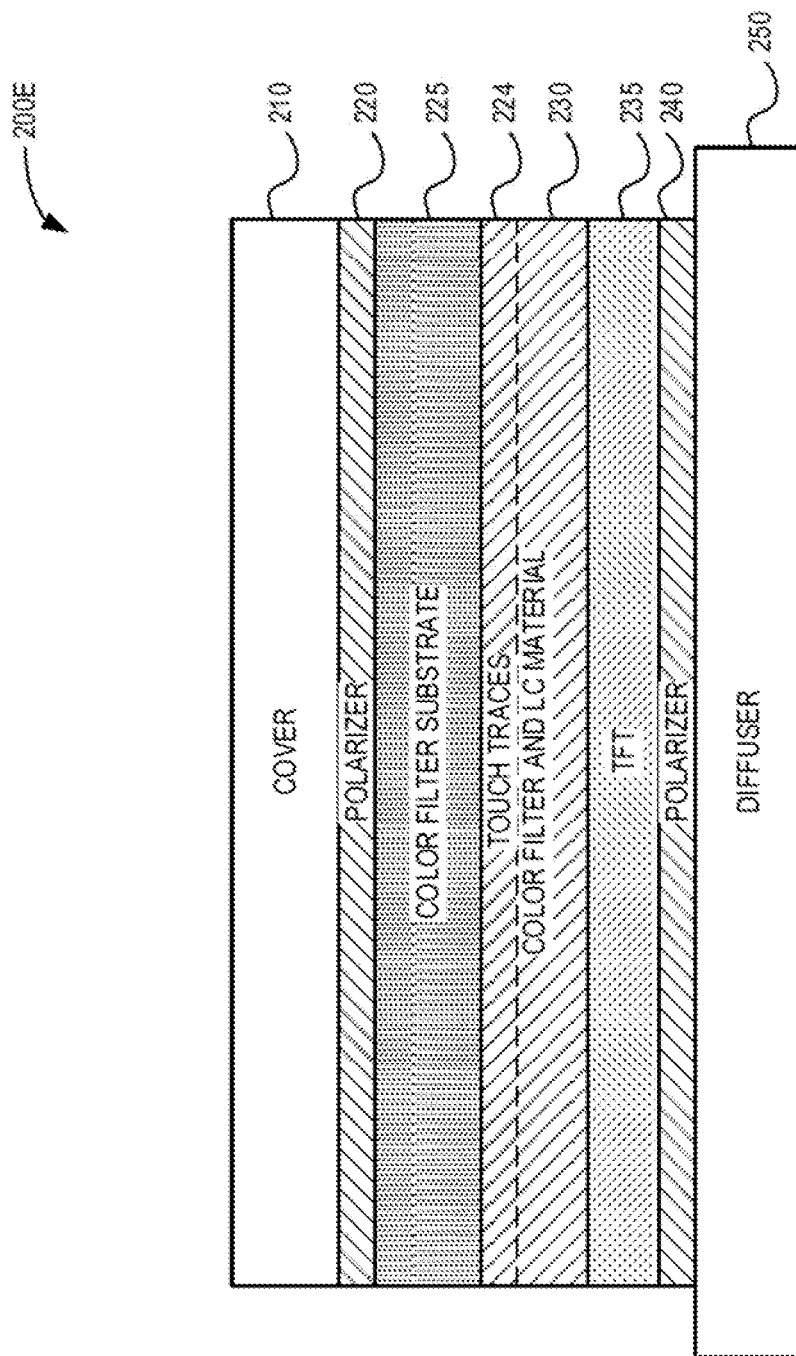

Referring now to FIG. 2E, there is illustrated a simplified cross-sectional view of a portion of another prior art display assembly. Display assembly 200E is generally analogous to display assembly 200A, but differs in that touch sensing elements 224 may be deposited or coated beneath color filter substrate 225 or atop color filter layer 230. For example, transparent conductive traces (e.g., indium tin oxide (ITO), indium zinc oxide (IZO), etc.) may be coated or deposited on the underside of color filter substrate 225.

Figure 2F:
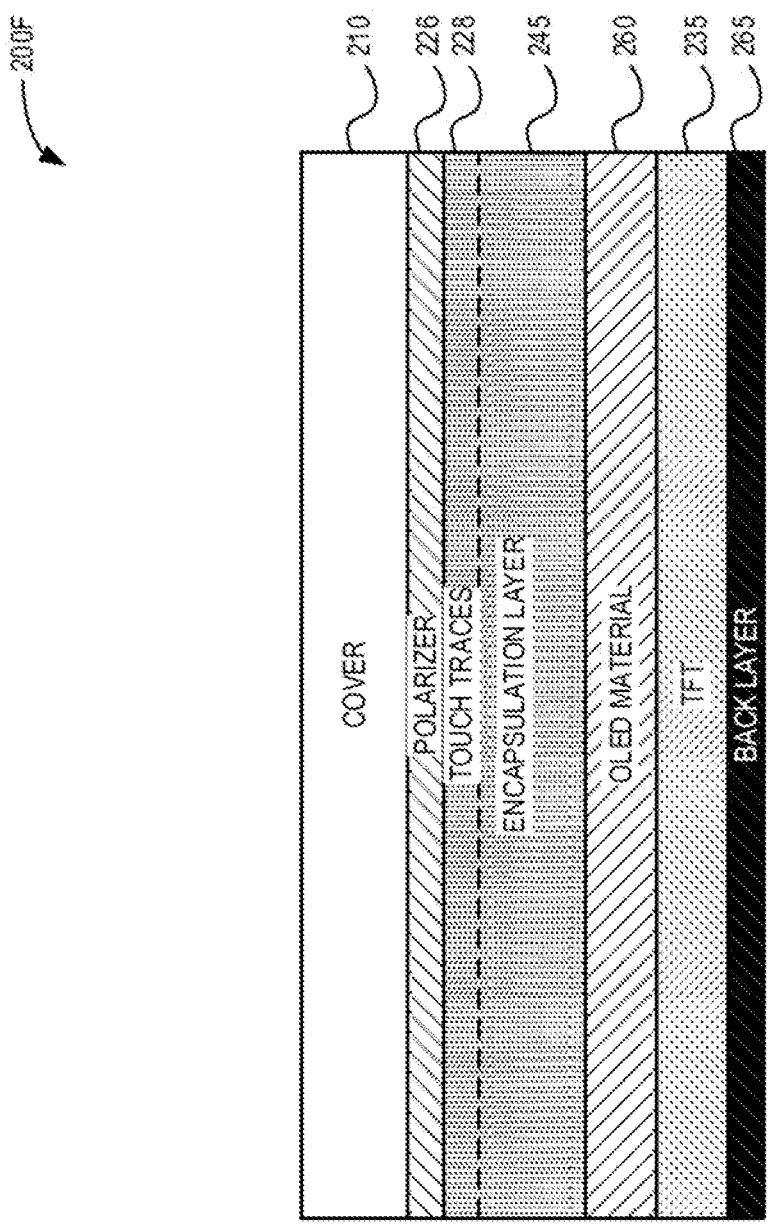

Referring now to FIG. 2F, there is illustrated a simplified cross-sectional view of a portion of another prior art display assembly. Display assembly 200F is generally analogous to display assembly 200B, but differs in that touch sensing elements 228 may be deposited or coated atop encapsulation layer 245. For example, transparent conductive traces (e.g., indium tin oxide (ITO), indium zinc oxide (IZO), etc.) may be coated or deposited on the encapsulation layer 245.

Figure 2G:
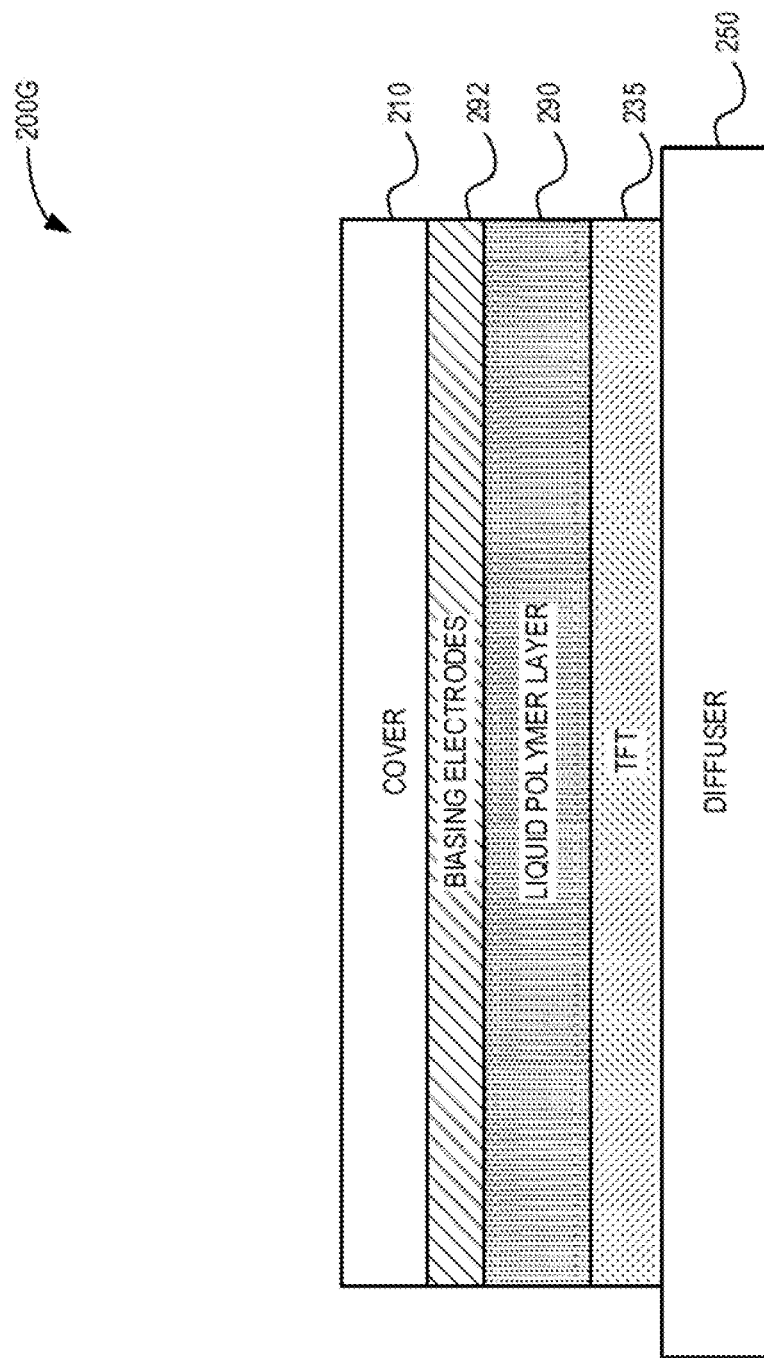

Referring now to FIG. 2G, there is illustrated a simplified cross-sectional view of a portion of another prior art display assembly. Display assembly 200G is an electrophoretic display assembly, also known as an "e-Ink" display.

Display assembly 200G may have a diffuser 250 and a TFT layer 235. A liquid polymer layer 290 containing e-Ink capsules is provided above TFT layer 235. A biasing layer 292 with transparent electrodes is provided atop the liquid polymer layer. Transistors in TFT layer 235 work in conjunction with electrodes in biasing layer 292 to bias the e-Ink capsules in liquid polymer layer 290 to a selected orientation (i.e., either admitting or blocking light from diffuser 250).

Referring now to FIG. 3, there is illustrated a plan view of an example display assembly with touch panel traces shown. Display assembly 300 is a projected capacitive touch screen, and includes a plurality of transmitter traces 310 (shown as vertical traces) and a plurality of receiver traces 320 (shown as horizontal traces) forming a touch sensing grid. Traces 310 and 320 are electrically conductive and substantially optically transparent in order to be overlaid on a display pixel array 350. For example, the traces may be formed by depositing ITO or IZO on a glass substrate. Moreover, transmitter traces 310 are electrically insulated from receiver traces 320, for example with an intermediate insulating barrier formed of glass or some other dielectric.

In operation, a driver circuit 312 applies a voltage to the transmitter traces 310 to create an electrostatic field. In the absence of an external stimulus (e.g., finger or stylus), the electrostatic field is uniform across the grid. Each intersection of a transmitter and receiver trace forms a capacitor, which has a corresponding capacitance that can be measured by a receiver circuit 322.

When a conductive object contacts the panel, the uniform electrostatic field becomes locally distorted. This distortion causes a change in capacitance (e.g., reduction in mutual capacitance) at an intersection of the transmitter and receiver traces. This change in capacitance can be determined by measuring a voltage on each of the receiver traces 320, to identify the location of a touch event on the grid.

Typically, there are between 10 to 16 transmitter traces 310, and 10 to 16 receiver traces 320, resulting in between 100 to 256 distinct touch locations. Traces are typically between 4 to 6 mm in width, to capture a typical finger touch.

Display pixel array 350 has a portion 410 consisting of a subset of the pixel array 350.

Figure 4A:
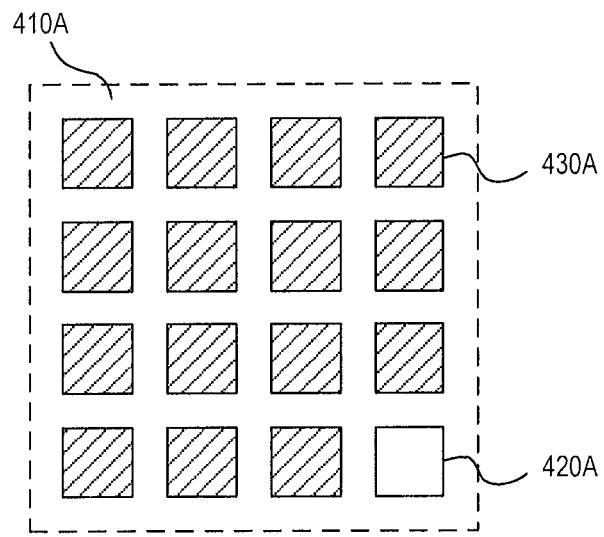
FIG. 4A is an example pixel array portion.

Referring now to FIG. 4A, there is illustrated an example pixel array portion in accordance with some embodiments.

Pixel array portion 410A may be a portion of a pixel array, such as pixel array 350. Pixel array portion 410A generally includes a regularly arranged array of display pixels 430A, which may comprise sub-pixels. However, at least one of the display pixels 430A in portion 410A may be replaced with a pressure sensing element 420A. Pressure sensing element 420A may be a pressure sensing element as described herein.

Figure 4B:
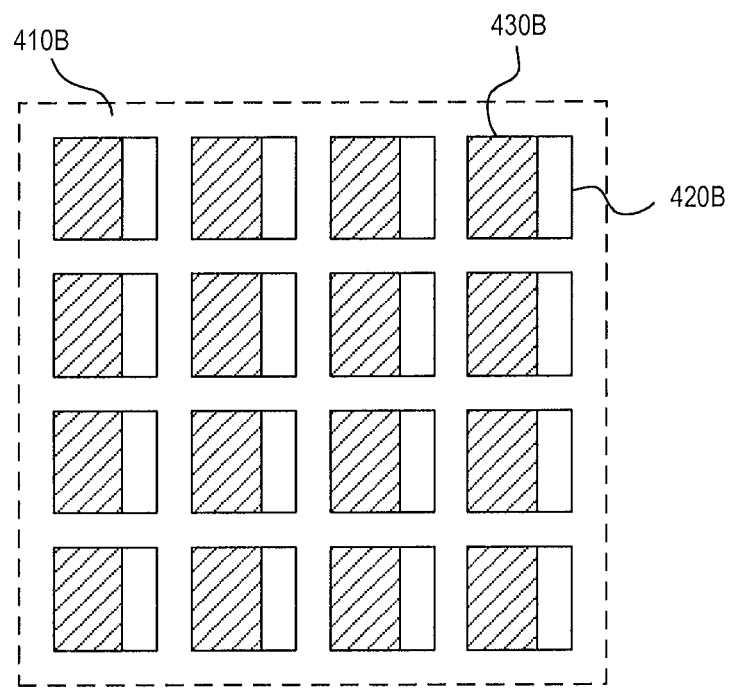
FIG. 4B is another example pixel array portion.

Referring now to FIG. 4B, there is illustrated another example pixel array portion in accordance with some embodiments.

Pixel array portion 410B may be a portion of a pixel array, such as pixel array 350. Pixel array portion 410B generally includes a regularly arranged array of display pixels 430B, which may comprise sub-pixels. Each of display pixels 430B may have a corresponding pressure sensing element 420B, which may be co-located adjacent to, or even integrated with, the display pixel 430B. In some cases, only a subset of display pixels 430B has a corresponding pressure sensing element 420B, although the grid pattern may be spaced to accommodate the omitted pressure sensing elements. Pressure sensing element 420B may be a pressure sensing element as described herein.

Figure 4C:
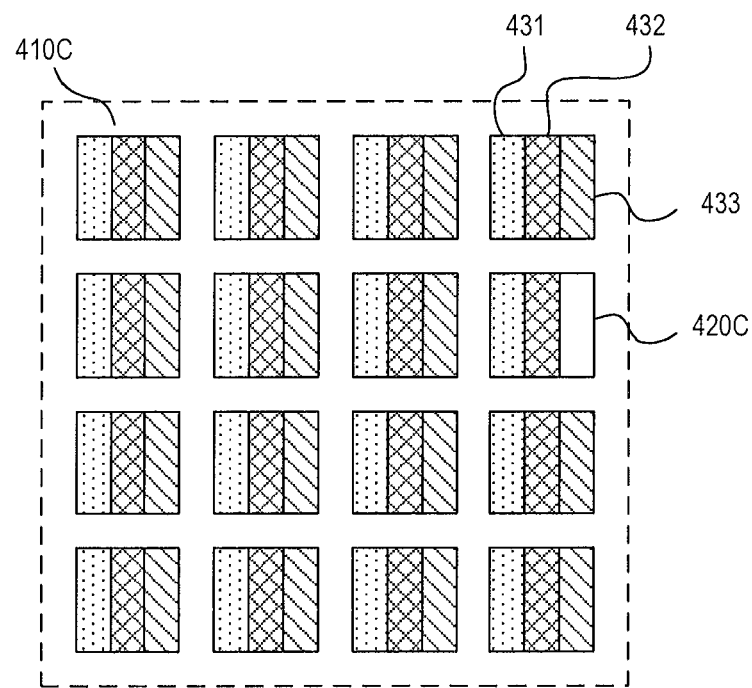
FIG. 4C is another example pixel array portion.

Referring now to FIG. 4C, there is illustrated another example pixel array portion in accordance with some embodiments.

Pixel array portion 410C may be a portion of a pixel array, such as pixel array 350. Pixel array portion 410C generally includes a regularly arranged array of sub-pixels 431, 432 and 433, each of which may correspond to a different color. However, at least one of the sub-pixels may be replaced with a pressure sensing element 420C. Pressure sensing element 420C may be a pressure sensing element as described herein.

The arrangements of pixel array portion 410A, 410B or 410C may be mixed, repeated or altered throughout a large display assembly, causing the display assembly to have a regular or semi-regular arrangement of the respective pressure sensing elements. In general, the number and spacing (pitch) of pressure sensing elements may determine the degree of sensitivity to pressure. For example, relatively few pressure sensing, elements may be used for a high sensitivity device. However, to provide more fine-grained sensitivity detection, a larger number of pressure sensing elements may be used.

Figure 5A:
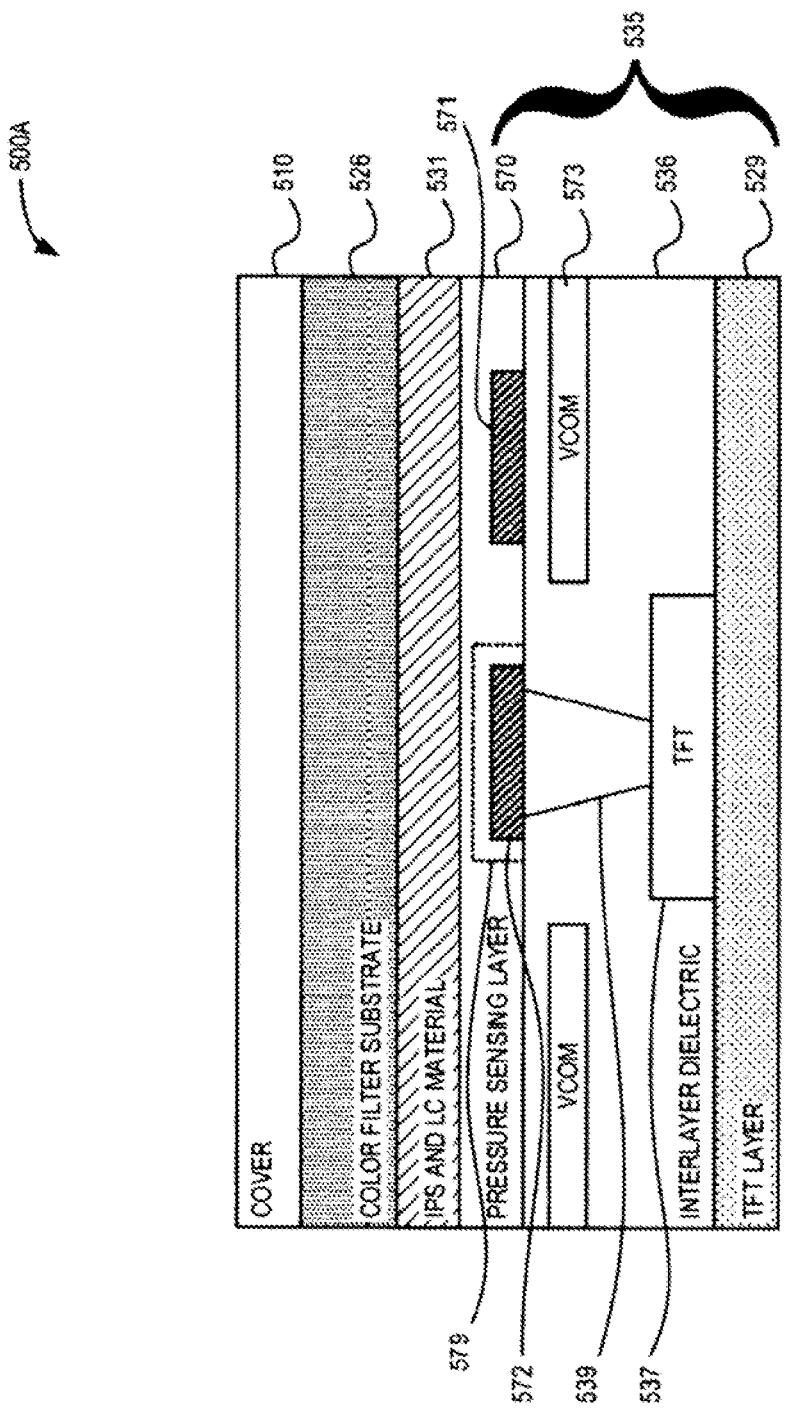
FIG. 5A is a simplified cross-sectional view of a portion of an example display assembly.

Referring now to FIG. 5A, there is illustrated a simplified cross-sectional view of a portion of an example display assembly in accordance with some embodiments. Portions of the example display assembly, such as a diffuser, polarizer layers, and adhesive layers, are omitted to aid in understanding. Display assembly portion 500A is generally an in-plane switching (IPS) display device with pressure sensing ability.

Display assembly portion 50 has an integrated circuit layer 535, which includes an integrated circuit substrate 529 and an interlayer dielectric 536. Integrated circuit layer 535 may be a TFT layer and substrate 529 may be a TFT substrate, which may act as the base layer. A plurality of display pixel electrodes 571 are provided atop interlayer dielectric 536. In addition, a pressure sensing electrode 572 is also provided atop interlayer dielectric layer 536. Both types of electrode may be provided by, for example, deposition in an integrated circuit fabrication process, or post-fabrication by mechanical application.

Pressure sensing electrode 572 is electrically coupled to a detection circuit 537 via a conductor 539. Detection circuit 537 may comprise one or more thin film transistors, for example. Examples of detection circuits are described, herein with reference, for example, to FIGS. 6A and 7A. One or more common voltage electrodes 573 may be embedded within interlayer dielectric 536 to provide for the proper operation of detection circuit 537, and to reduce noise from, for example, operation of the display pixel elements.

Circuitry associated with the operation of display pixels is omitted from FIG. 5A, so as not to obscure description of the pressure sensing elements.

In some embodiments, each display pixel electrode 571 may also serve as a pressure sensing electrode 572, or vice versa, and there may be a combined display circuit and a pressure sensing circuit 537 for each electrode. In other embodiments, display pixel electrodes 571 may have separate circuits.

A pressure sensitive layer 570 is provided atop display pixel electrodes 571 and pressure sensing electrodes 572. The pressure sensitive layer is generally formed of pressure sensitive material, such as a piezoelectric material, a quantum-tunneling composite material, or equivalent material, that converts a change in an applied pressure into a corresponding voltage or electric output signal. The pressure sensitive material is preferably substantially optically transparent.

The pressure sensitive layer may be screen printed, deposited, or laminated into a substrate, where the substrate may be glass, plastic, polyester, thin metal, or the like in a semiconductor display fabrication process.

Each pressure sensing electrode 572 and the surrounding region of pressure sensitive material 579 may form a distinct pressure sensing element. Thus, when a force is applied incident to the region of pressure sensitive material 579, causing a compression or deformation of the region of material, this change in pressure within the pressure sensitive material may cause a corresponding change in voltage at pressure sensing electrode 572. This voltage change can be detected by pressure sensing circuit 537 via conductor 539.

Although pressure sensitive layer 570 may be monolithic, the piezoelectric effect in response to applied pressure is generally localized. Thus, an applied pressure in one location of the pressure sensitive layer 570 will produce a larger voltage change at a nearby electrode than at a more distant electrode.

A liquid crystal layer 531 may be provided atop the pressure sensitive layer 570. In some embodiments, the liquid crystal layer 531 may be an in-plane switched (IPS) LCD layer. A color filter layer 526 and a cover layer 510 can also be provided, as with other layers.

As shown in FIG. 5A, the pressure sensing layer may be separate from a liquid crystal layer. In other embodiments, the pressure sensing layer may be integrated with, or provided upon a cover layer. In some cases, the pressure sensing layer may be provided above a layer containing display pixels, or below the layer containing display pixels. In some cases, pressure sensing elements may be co-planar with display pixels. In still other embodiments, the pressure sensing layer may be integrated with an integrated circuit layer. In still other embodiments, pressure sensing material may be interspersed with a liquid crystal (or other display) material in a set spatial pattern, either full pixel or sub-pixel.

Figure 5B:
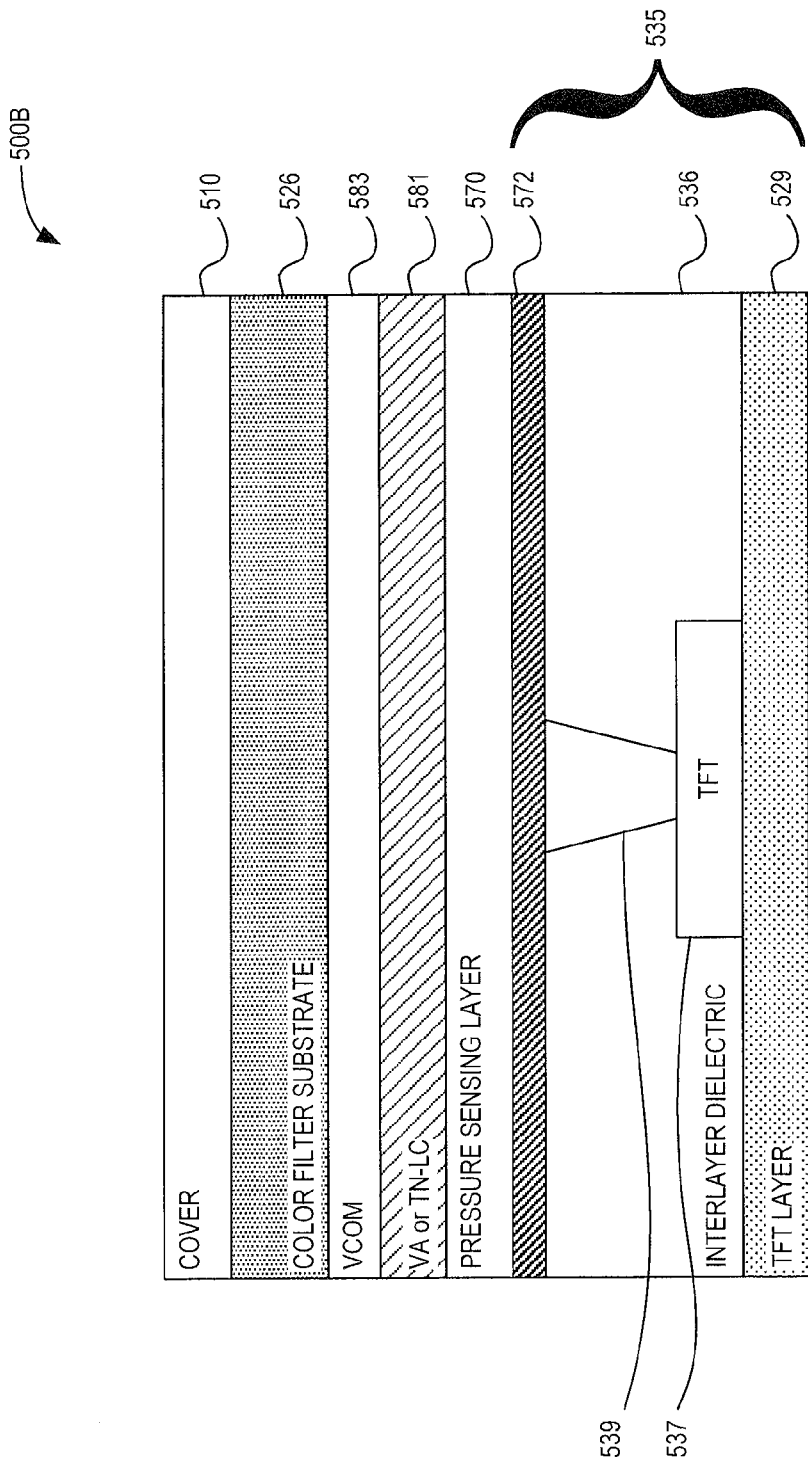
FIG. 5B is a simplified cross-sectional view of a portion of another example display assembly.

Referring now to FIG. 5B, there is illustrated a simplified cross-sectional view of a portion of another example display assembly in accordance with some embodiments. In contrast to assembly portion 500A, which illustrates an example IPS assembly, assembly portion 500B depicts an example Twisted Nematic (TN) or Vertical Alignment (VA) assembly with pressure sensing ability.

As with assembly 500A, assembly 500B includes an integrated circuit layer 535 and a pressure sensing electrode 572 in contact with a pressure sensitive layer 570.

A liquid crystal layer 581 is provided atop the pressure sensitive layer 570. The liquid crystal layer 581 may be a TN medium or a VA medium, for example.

A common voltage electrode 583 is provided atop the liquid crystal layer 581.

As with assembly 500A, a color filter layer 526 and cover layer 510 are provided. Other portions of the example display assembly, such as a diffuser, polarizer layers, and adhesive layers, are omitted to aid in understanding.

Figure 5C:
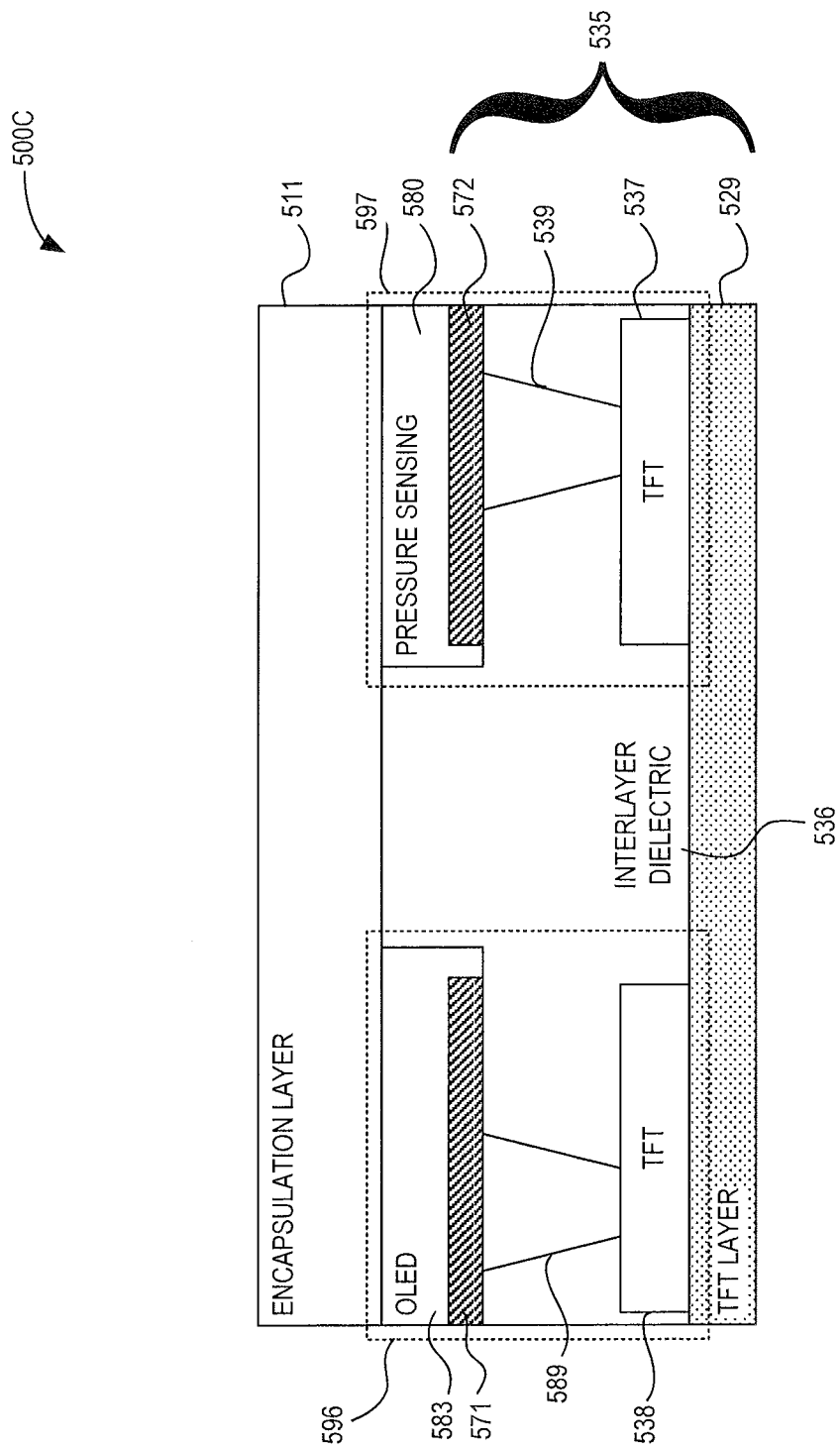
FIG. 5C is a simplified cross-sectional view of a portion of another example display assembly.

Referring now to FIG. 5C, there is illustrated a simplified cross-sectional view of a portion of another example display assembly in accordance with some embodiments. In contrast to assembly portions 500A and 500B, which illustrate LCD assemblies, assembly portion 500C illustrates an example OLED device with pressure sensing ability.

Display assembly portion 500C includes an integrated circuit layer 535, which may comprise a TFT substrate 529, which may act as base layer, and interlayer dielectric 536.

Interlayer dielectric 536 may have embedded therein a display pixel element 596 and a pressure sensing element 597.

Display pixel element 596 may be a conventional OLED display pixel, including a driving circuit 538, a conductor 589 connecting to a display electrode 571 which contacts OLED material 583.

Pressure sensing element 597 includes a detection circuit 537 connected to a pressure sensing electrode 572 via a conductor 539. Pressure sensing electrode contacts pressure sensitive material 580, which is deposited generally in the same layer as OLED material 583 (e.g., not atop OLED material 583).

An encapsulation layer 511 is provided to seal the display assembly portion.

Other portions of the example display assembly, such as polarizer and adhesive layers, are omitted to aid in understanding.

Figure 5D:
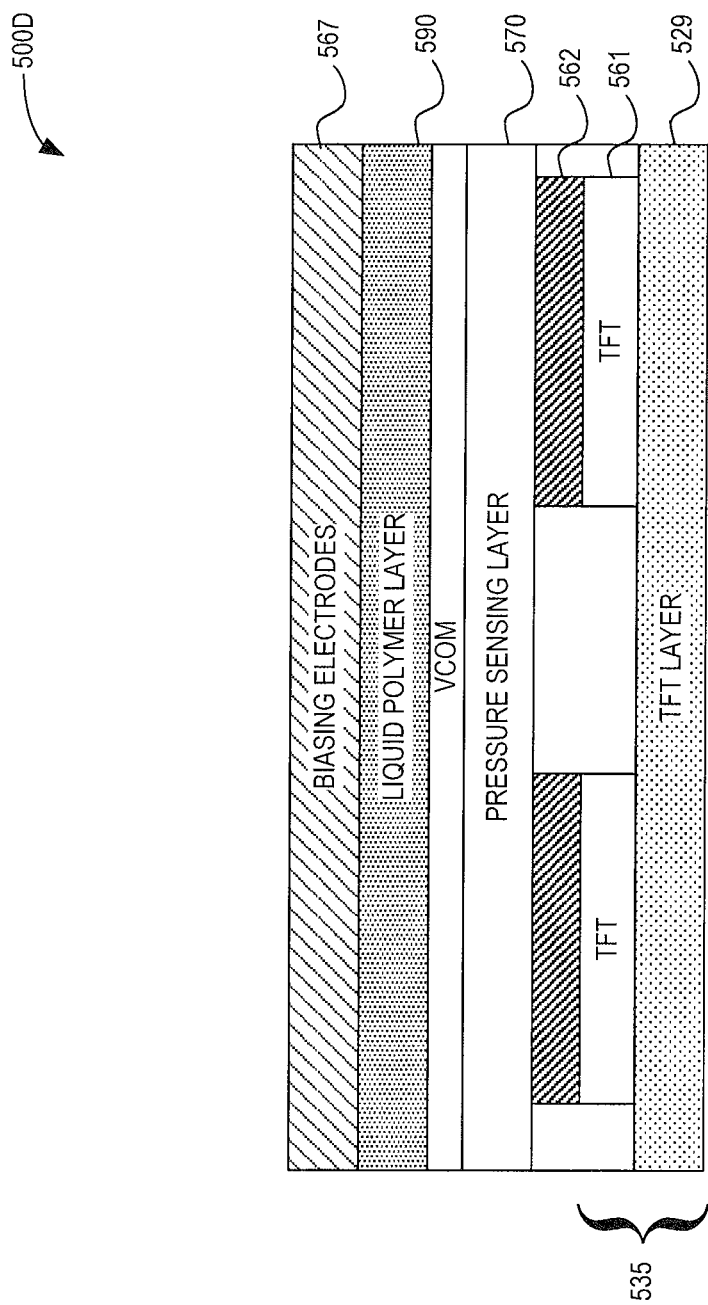
FIG. 5D is a simplified cross-sectional view of a portion of another example display assembly.

Referring now to FIG. 5D, there is illustrated a simplified cross-sectional view of a portion of another example display assembly in accordance with some embodiments. Display assembly portion 500D illustrates an example electrophoretic display device with pressure sensing ability.

Assembly portion 500D includes an integrated circuit layer 535 with a TFT substrate 529, a plurality of driving and detection circuits 561, which combine the driving capabilities of a driving circuit 538 with the detection capabilities of a detection circuit 537.

A combined display and pressure sensing electrode 562 is connected to circuit 561, and a pressure sensitive layer 570 and liquid polymer layer 590, respectively, are provided atop the integrated circuit layer 535.

In some embodiments, pressure detection can be suspended while the display is not being actively refreshed. In such a mode, power consumption may be close to zero. Pressure sensitive buttons (not shown) can be provided at a periphery of the display assembly, which can be used to trigger further pressure detection in the display when in a power saving mode.

Figure 5E:
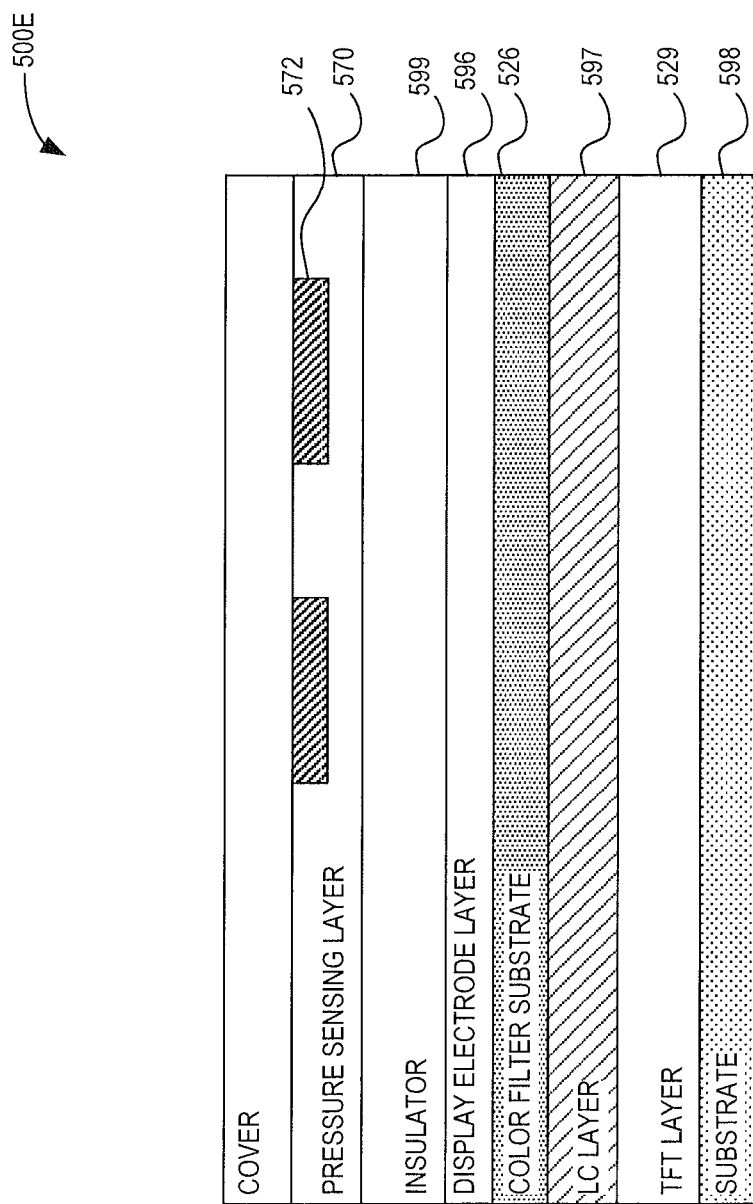
FIG. 5E is a simplified cross-sectional view of a portion of another example display assembly.

Referring now to FIG. 5E, there is illustrated a simplified cross-sectional view of a portion of another example display assembly in accordance with some embodiments. Display assembly portion 500E illustrates an example IPS display assembly with improved noise performance.

Assembly portion 500E may be generally analogous to assembly portion 500A. However, in contrast to assembly portion 500A, assembly portion 500E has an insulating layer 599 provided between pressure sensitive layer 570 and other portions of the display assembly.

In assembly portion 500E, pressure sensitive layer 570 is provided above other layers, including the liquid crystal layer 597 and TFT layer 529. A separate electrode layer 596 may also be provided.

The insulating layer 599 may be formed of a dielectric, such as aluminum oxide, silicon dioxide or silicon nitride (each of which can be optically transparent). The insulating layer 599 generally serves to prevent capacitive charge leakage from pressure sensitive layer 570 through electrodes 572 to other layers and, in particular, a ground plane of substrate 598, which can make it difficult to measure capacitance modulation and thus the applied force.

By providing insulating layer 599, capacitive charge leakage is mitigated, and charge is transferred primarily via conductive traces (not shown) provided directly to electrodes 572, for example, in the pressure sensing layer. In particular, electrodes 572 may be coupled to detection circuits separated from the display assembly (e.g., located off-panel).

Although the described approach is shown in the context of an IPS display, a similar approach of providing an insulating layer between the pressure sensitive layer and other layers may also be used with other assembly types, such as OLED, VA-LCD, TN-LCD, and the like.

Figure 6A:
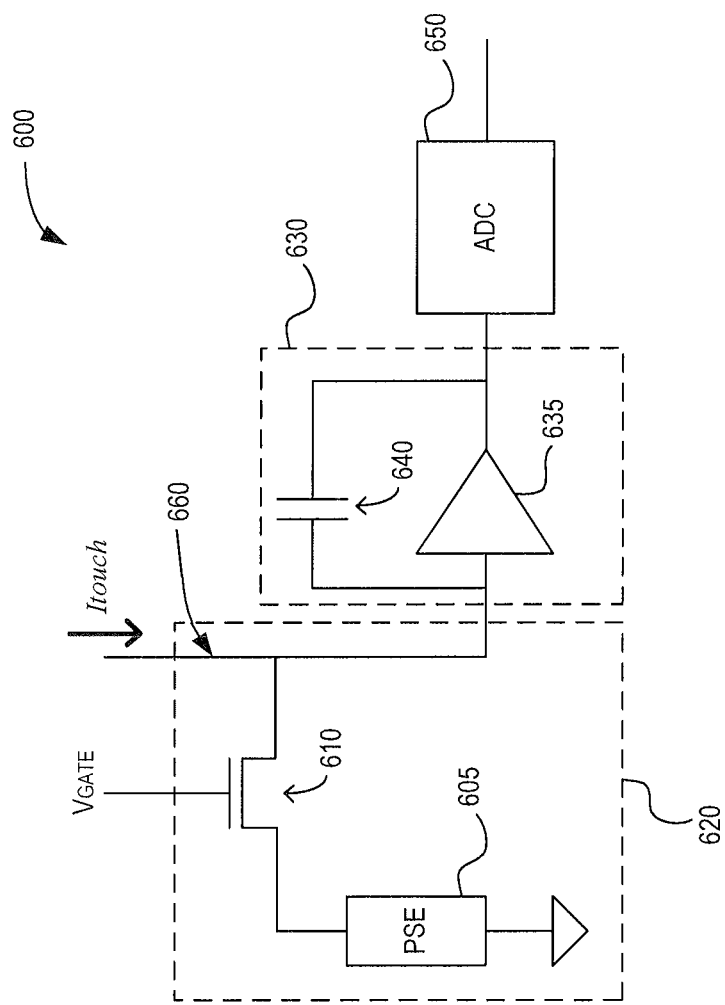
FIG. 6A is a schematic diagram of an example detection circuit.

Referring now to FIG. 6A, there is illustrated a schematic diagram of an example detection circuit in accordance with some embodiments.

Detection circuit 600 uses a passive approach, and may be used, for example, to provide a detection circuit such as detection circuit 537 or 561 of display assembly portions 500A to 500E, for example.

Detection circuit 600 has an in-pixel portion 620, which includes a pressure sensing element 605, such as pressure sensing element 579 of assembly portion 500A, and an addressing transistor 610, which may be a PMOS or NMOS transistor for example. An output of pressure sensing element 579 is connected to addressing transistor 610. A gate of addressing transistor 610 is addressable, such that when addressing transistor 610 is switched on, the output of pressure sensing element 605 is coupled to a detection line 660 via transistor 610.

Thus, when pressure sensing element 605 detects a higher voltage corresponding to a touch, and when addressing transistor 610 is switched on, a higher current $I_{touch}$ is transferred to detection line 660.

Detection line 660 is input to a column charge amplifier 630, which may for example include an op-amp 635 and capacitor 640 connected in parallel. The output of column charge amplifier 630 may be converted to a digital value by analog-to-digital convertor (ADC) 650.

Generally, there may be one column charge amplifier 630 for a plurality of pixels (e.g., line, column, row of pixels).

Figure 6B:
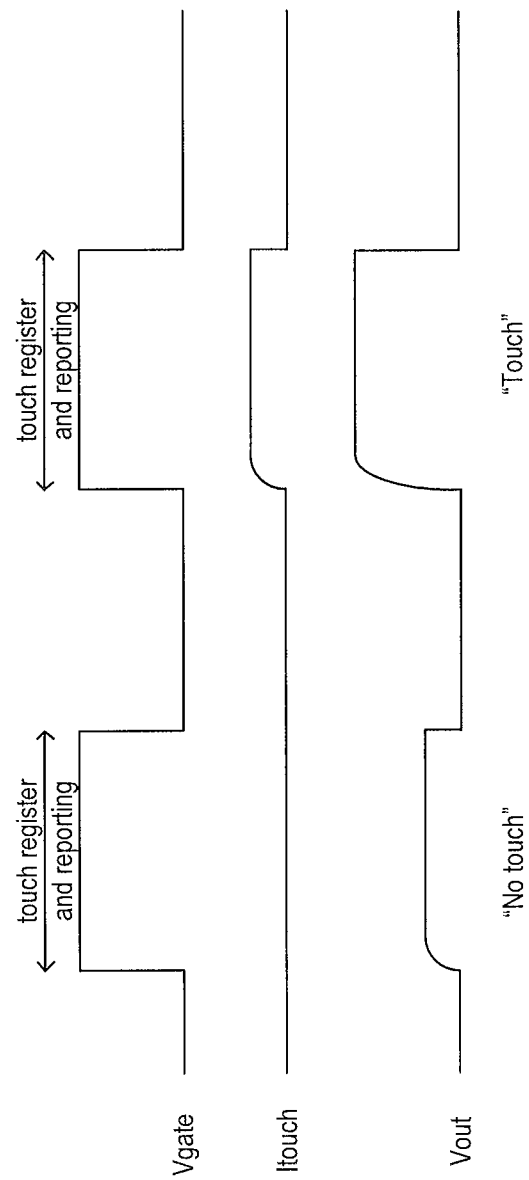
FIG. 6B illustrates signals at various nodes of the detection circuit of FIG. 6A.

FIG. 6B illustrates signals at various nodes of detection circuit 600 when a touch is or is not registered. It can be observed that a voltage measured at the output of a column charge amplifier (Vout) is generated whether or not a touch is detected, although the output voltage is lower when no touch is detected. In particular, when no touch is registered, (touch is zero, and Vout is low. When a touch is registered, Itouch increases, and Vout is relatively higher.

Detection circuit 600 may be implemented in whole or in part in an integrated circuit layer of a display assembly using, for example, TFTs. In some embodiments, only the in-pixel portion 620 is implemented in the integrated circuit layer, while the amplifier 630 and ADC 650 may be provided externally.

Figure 7A:
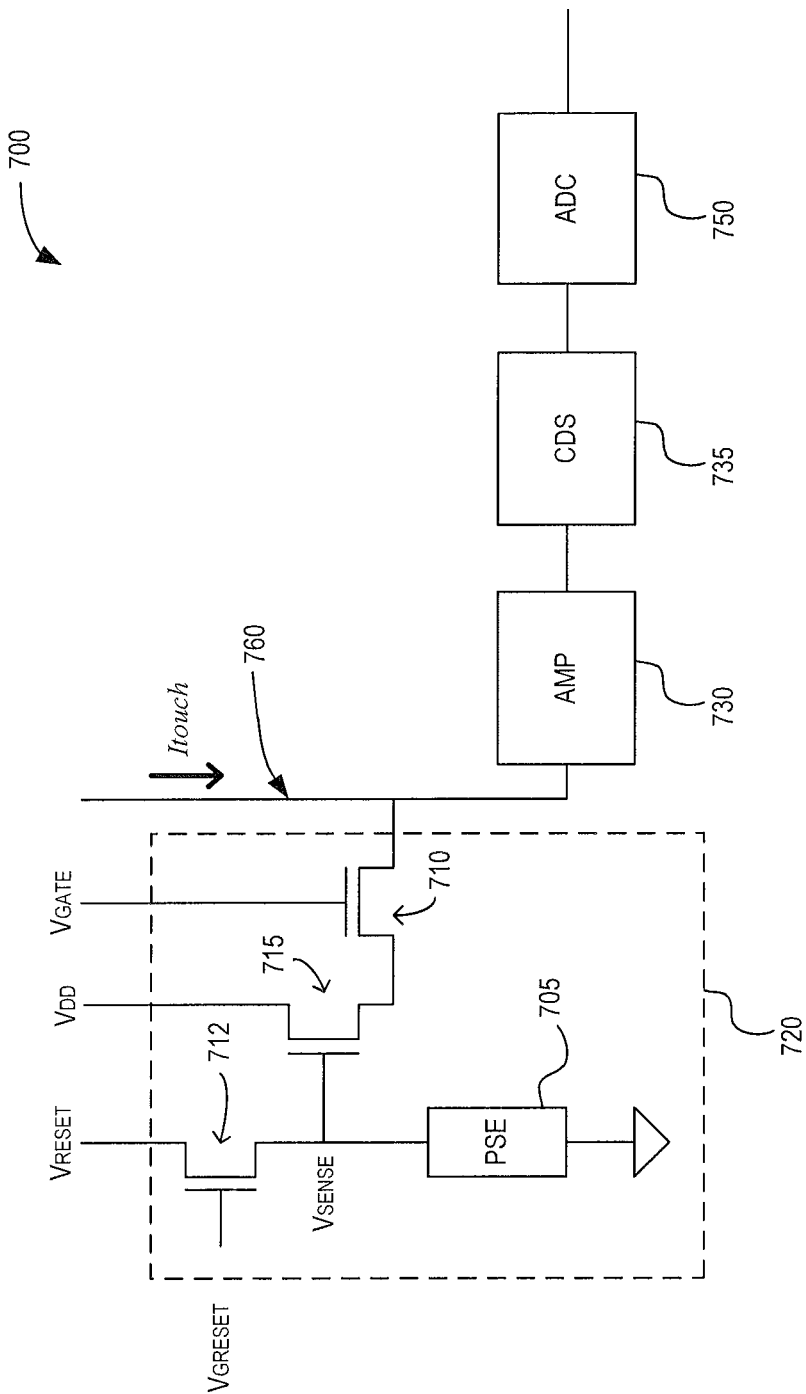
FIG. 7A is a schematic diagram of another example detection circuit.

Referring now to FIG. 7A, there is illustrated a schematic diagram of another example detection circuit in accordance with some embodiments.

Detection circuit 700 uses an active approach whereby integration of the pressure sensing element output occurs in-pixel, and may be used, for example, to provide a detection circuit such as detection circuit 537 or 561 of display assembly portions 500A to 500E, for example.

Detection circuit 700 has an in-pixel portion 720, which includes a pressure sensing element 705, such as pressure sensing element 579 of assembly portion 500A, a reset transistor 712, an integrating transistor 715 and an addressing transistor 710. Each transistor 712, 715 and 710 may be a PMOS or NMOS transistor, for example, depending on the specific circuit configuration.

In operation, an output of pressure sensing element 705 is connected to a gate of transistor 715, which serves as an integrator. In the example shown, a source of transistor 715 is connected to a bulk supply voltage, causing a drain terminal of transistor 715 to integrate the input to the gate of transistor 715. This integrated output can be coupled to a detection line 760 when an addressing transistor 710 is switched on.

The integrated output can be provided to a column amplifier 730, correlated double sampler 735, and digitized using ADC 750.

Correlated double sampler 735 may be used to improve signal accuracy and signal-to-noise ratio. Generally, correlated double sampling is a technique used when measuring sensor outputs, which allows an undesired offset to be removed from a measured value (e.g., voltage, current). To perform correlated double sampling, the output of a sensor may be measured twice: once in a known condition and again in an unknown condition. The value measured during the known condition can be subtracted from the value measured during the unknown condition.

Correlated double sampling is used, for example, in switched capacitor op-amps to improve the gain of a charge-sharing amplifier, while adding an extra phase.

In the described embodiments, correlated double sampling may be performed by measuring the output of a pixel or group of pixels after a reset is performed (e.g., the known condition) and subtracting this output from the output at the end of an integration period (e.g., the unknown condition). The reset may be performed, for example, by triggering reset transistor 712.

In some embodiments, the correlated double sampler 735 may be omitted.

Figure 7B:
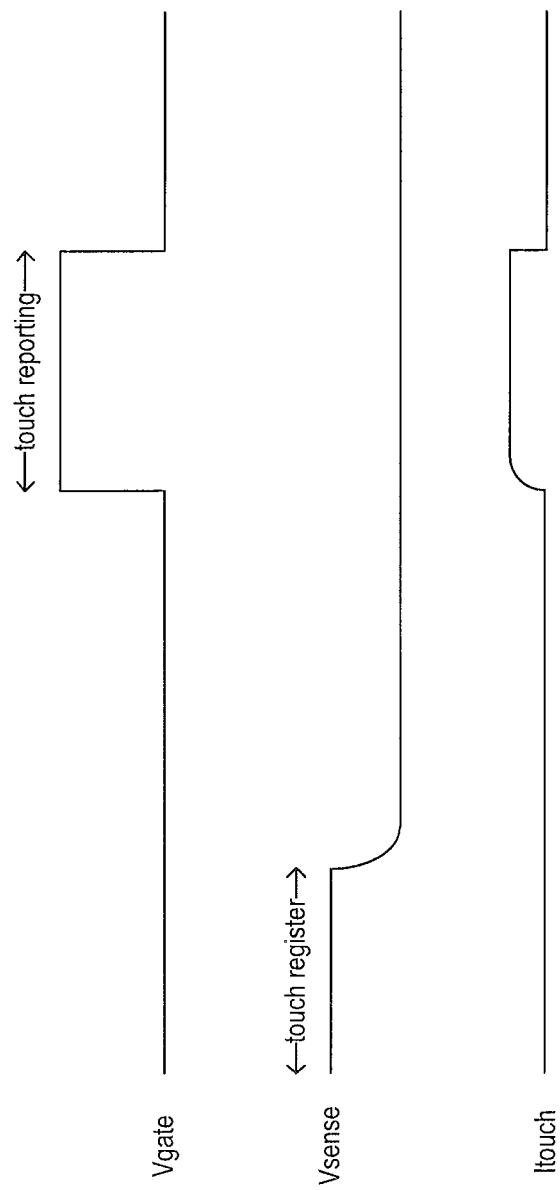
FIG. 7B illustrates signals at various nodes of the detection circuit of FIG. 7A.

In contrast to detection circuit 600, detection circuit 700 does not require that a pressure sensing element provide an output voltage concurrently with the detection and amplification. Accordingly, a user's touch may occur separately from the detection event. As illustrated in FIG. 7B, this allows for greater detection sensitivity, since detection can occur during less noisy times.

Reset transistor 712 can be activated to reset the output node of pressure sensing element 705 to a default voltage (e.g., Vreset). This reset pulse may also act to erase any material memory effect that may exist in the pressure sensing element, which could affect the measurement calibration.

Detection circuit 700 may be implemented in whole or in part in an integrated circuit layer of a display assembly using, for example, TFTs. In some embodiments, only the in-pixel portion 720 is implemented in the integrated circuit layer, while the amplifier 730, CDS 735 and ADC 750 may be provided externally.

Figure 8:
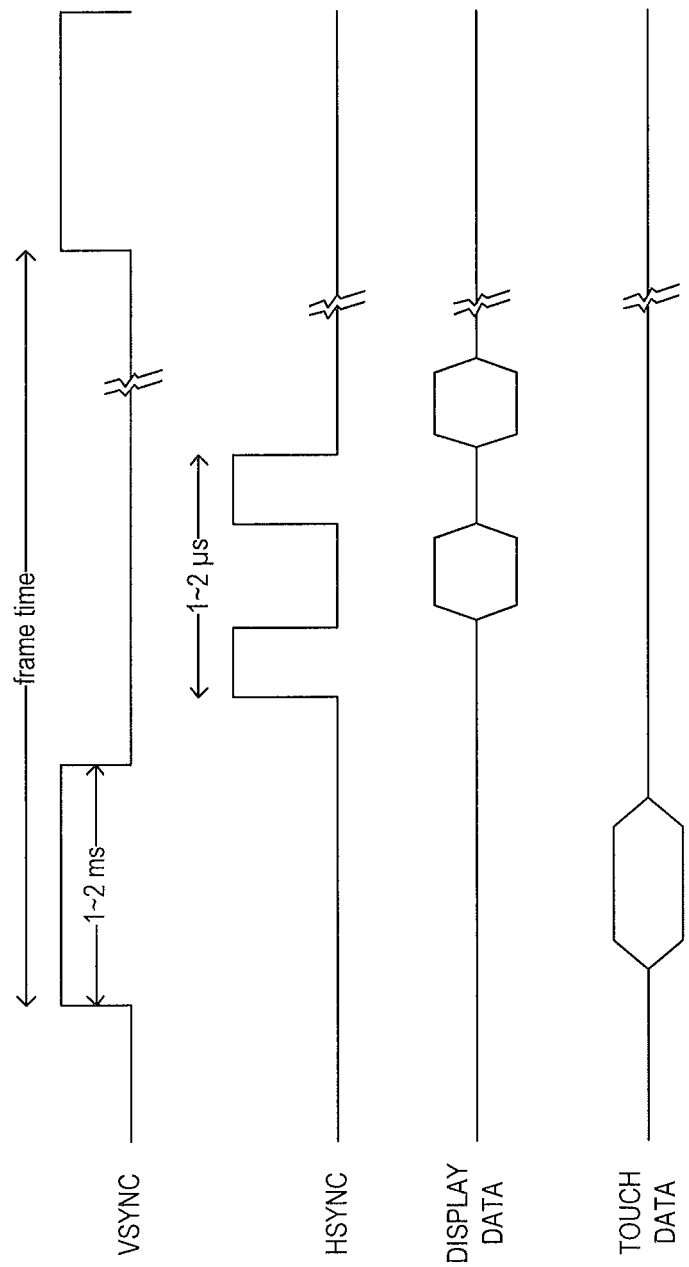
FIG. 8 is an example timing diagram for a display assembly with pressure sensing.

Referring now to FIG. 8, there is illustrated an example timing diagram for a display assembly with pressure sensing.

Generally, data line switching during display programming can be a major source of noise for capacitive touch sensing and pressure sensing. In particular, capacitive coupling through data lines can interfere with touch detection, reducing signal-to-noise ratio.

In some embodiments, touch detection and reporting, including sensing of the touch events, can be synchronized with display programming quiet periods. In particular, touch detection and reporting can be synchronized with vertical or horizontal blanking intervals, or both. The vertical blanking interval may be particularly suited to touch detection and reporting, since there is generally little or no display programming signaling in this period.

Referring now to FIG. 9, there is illustrated an example current-force characteristic for a pressure sensitive material, such as a pressure sensitive material for use in pressure sensing layer 570.

As described herein, the pressure sensitive material may exhibit a piezoelectric effect or quantum tunneling effect. In general, the pressure sensitive material may have an analog response characteristic as shown in FIG. 9, with a non-linear response to pressure sensing. Various other response characteristics may also be suitable.

The described embodiments generally provide a pressure sensing architecture suitable for use with liquid crystal (LC), organic light emitting diode (OLED), electrophoretic, or other similarly fabricated displays. The described architecture generally includes, but is not limited to, a bottom TFT structure and a top structure with color filter material, and with liquid crystal, electrophoretic or OLED material provided in between. A piezoelectric or equivalent material is inserted or integrated into the display assembly. The piezoelectric or equivalent material is capable of providing an analog electrical signal in response to incident touch pressure. Transmitting and receiving electrodes can be provided and used to electrically bias the piezoelectric or equivalent material to allow detection of applied force.

The described embodiments can be fully integrated within a pixel array, semi-integrated within a pixel array (e.g., where parts of the pixel elements are re-used for pressure sensing), or separately disposed on an individual substrate and later integrated with a pixel array (e.g., laminated or otherwise affixed atop or below the pixel array).

Moreover, the describe pressure sensing architecture can be fabricated using existing display fabrication techniques and sequences, reducing complexity and cost.

Although the described embodiments have been described primarily with reference to "in-cell" display technologies, the described techniques are applicable to many other display assembly structures, including "in-cell", "on-cell", "one-glass solution" and laminated panel approaches. In general, the described embodiments provide analog pressure sensing combined with conventional digital touch methods, such as projected capacitive or resistive touch sensing. The various methods of fabrication combined with the accompanied methods of operation allow the tuning of analog sensitivity to provide high gain and low noise operation. Moreover, tight integration can be realized in the backplane fabrication sequence, eliminating manufacturing steps and logistical handling of multiple substrates to minimize cost. The described embodiments also allow for high signal to noise ratio, enabling accurate, fast and sensitive touch and force sensing, as well as ultra-low power modes that significantly improve battery life and device operation times compared to known touch panel architectures and technologies.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. The scope of the claims should not be limited by the preferred embodiments and examples, but should be given the broadest interpretation consistent with the description as a whole.

We claim:

1. A method of pressure sensing in a display device comprising:
providing a plurality of display pixels provided above a base layer and below a cover layer of the display device;
providing a plurality of pressure sensing elements above the base layer, each of the pressure sensing elements including an electrode and a pressure sensitive layer adjacent to the electrode;
converting a pressure of a force applied to at least one pressure sensing element of the plurality of pressure sensing elements into a sensed force output at the electrode of the at least one pressure sensing element based on the force, wherein the sensed force output is generated by a piezoelectric effect from deformation of the pressure sensitive layer included in the at least one pressure sensing element;
integrating the sensed force output of the at least one pressure sensing element using an integrator to provide an integrated value of the sensed force output on an output of the integrator;
addressing the at least one the pressure sensing elements to provide the sensed force output by turning off an addressing switch to disconnect the output of the integrator from an output of the addressing switch and cause the integrator to store a charge generated by the sensed force output of the at least one pressure sensing element as the integrated value, and turning on the addressing switch to the integrated value on the output of the integrator to the output of the addressing switch, wherein the stored charge is proportional to the pressure of a force applied to the at least one of the plurality of pressure sensing elements;
and,
providing a current on a detection line to an input of a charge amplifier that is coupled to the output of the addressing switch and the detection line, the detection line providing the current to the charge amplifier input, wherein when the addressing switch is in the on state, the integrator output is connected to the detection line and an increase in the current at the detection line at the input of the charge amplifier caused by the integrated value causes a change in the voltage on the amplifier output indicative of the force causing the sensed output on the at least one of the plurality of pressure sensing elements.

2. A pressure sensing display device, comprising:
a cover layer;
a base layer;
a plurality of display pixels provided above the base layer and below the cover layer;
a plurality of pressure sensing elements provided above the base layer, each of the pressure sensing elements including an electrode and a pressure sensitive layer adjacent to the electrode, wherein each of the pressure sensing elements is configured to convert a pressure of a force applied to the pressure sensing element into an sensed output at the electrode based on the force applied to the pressure sensing element, wherein the sensed output is generated at least in part by a piezoelectric effect from deformation of the pressure sensitive layer; and,
at least one detection circuit comprising:
an integrator having an integrator input coupled to the electrode of at least one of the plurality of pressure sensing elements and an integrator output, wherein the integrator provides an integrated value of the sensed output of at least one of the plurality of pressure sensing elements on the integrator output;
a detection line for providing a current;
an addressing switch having a switch input coupled to the integrator output and a switch output coupled to the detection line, wherein the addressing switch is addressable to be switched off to disconnect the integrator output from the detection line and cause the integrator to store a charge generated by the sensed output of the at least one of the plurality of pressure sensing elements as the integrated value, and addressable to be switched on and provide the integrated value on the integrator output to the switch output, wherein the stored charge is proportional to the pressure of a force applied to the at least one of the plurality of pressure sensing elements; and,
a charge amplifier having an amplifier output and, an amplifier input coupled to the switch output and to the detection line, the detection line providing the current to the charge amplifier input, wherein when the addressing switch is in the on state, the integrator output is connected to the detection line and an increase in the current at the detection line at the input of the charge amplifier caused by the integrated value causes a change in the voltage on the amplifier output indicative of the force causing the sensed output on the at least one of the plurality of pressure sensing elements.

3. The device of claim 2, wherein an integrated circuit layer is provided above the base layer and the integrated circuit layer comprises a thin film transistor circuit.

4. The device of claim 2, wherein the electrode of each pressure sensing element comprises a pressure sensing electrode and each of the plurality of display pixels includes a pixel electrode, and wherein at least one pixel electrode from the plurality of display pixels serves as both a pixel electrode and a pressure sensing electrode of one of the plurality of pressure sensing elements.

5. The device of claim 2, wherein the device comprises a display assembly that includes the cover layer, the base layer, the plurality of display pixels and the plurality of pressure sensing elements, and wherein the at least one detection circuit is separated from the display assembly.

6. The device of claim 2, wherein each pressure sensing element is formed from a portion of the pressure sensitive layer adjacent to the electrode.

7. The device of claim 2, wherein the device further comprises a glass layer and the plurality of pressure sensing elements are provided above the glass layer.

8. The device of claim 2, wherein the pressure sensing elements are provided in a layer above the display pixels.

9. The device of claim 2, wherein the pressure sensing elements are provided in a layer below the display pixels.

10. The device of claim 2, wherein the pressure sensing elements are substantially co-planar with the display pixels.

11. The device of claim 2, wherein the display pixels are arranged in a grid, and wherein the pressure sensing elements replace display pixels in the grid at selected intervals.

12. The device of claim 2, wherein the display pixels are arranged in a first grid, and wherein the pressure sensing elements are arranged in a second grid.

13. The device of claim 12, wherein the second grid corresponds to the first grid.

14. The device of claim 2, wherein the detection circuit further comprises:

a reset transistor coupled to the electrode of the at least one of the plurality of pressure sensing elements wherein the sensed output is resettable by the reset transistor.

15. The device of claim 2, wherein the detection circuit further comprises:
a correlated double sampler configured to perform correlated double sampling on a signal based on the sensed output.

16. The device of claim 2, further comprising a controller, wherein the controller detects a blanking interval of the display pixels, and wherein the addressing switch is addressed to be switched on during the blanking interval.

17. The device of claim 16, wherein the blanking interval is a horizontal blanking interval.

18. The device of claim 16, wherein the blanking interval is a vertical blanking interval.

19. The device of claim 16, wherein the blanking interval is selectively determined by the controller between a horizontal and a vertical blanking interval.

* * * * *